United States Patent
Thom et al.

(10) Patent No.: US 10,146,916 B2
(45) Date of Patent: Dec. 4, 2018

(54) TAMPER PROOF DEVICE CAPABILITY STORE

(71) Applicant: Microsoft Technology Licensing, LLC, Redmond, WA (US)

(72) Inventors: Stefan Thom, Snohomish, WA (US); Robert Karl Spiger, Seattle, WA (US); David R Wooten, Redmond, WA (US); Merzin Kapadia, New Castle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 14/943,208

(22) Filed: Nov. 17, 2015

(65) Prior Publication Data

US 2017/0140130 A1    May 18, 2017

(51) Int. Cl.
| | |
|---|---|
| G06F 21/57 | (2013.01) |
| G06F 21/10 | (2013.01) |
| H04L 9/32 | (2006.01) |
| G06F 21/62 | (2013.01) |
| H04L 9/30 | (2006.01) |

(52) U.S. Cl.
CPC .............. *G06F 21/10* (2013.01); *G06F 21/57* (2013.01); *G06F 21/629* (2013.01); *H04L 9/30* (2013.01); *H04L 9/321* (2013.01); *G06F 2221/0742* (2013.01); *G06F 2221/0755* (2013.01)

(58) Field of Classification Search
CPC ... H04L 9/30; H04L 9/32; G06F 21/10; G06F 21/30; G06F 21/44; G06F 21/50
See application file for complete search history.

(56) References Cited

U.S. PATENT DOCUMENTS

| | | |
|---|---|---|
| 8,522,018 B2 | 8/2013 | Molina et al. |
| 8,607,065 B2 | 12/2013 | Thom et al. |
| 2001/0025311 A1* | 9/2001 | Arai .................... G06F 21/6218 709/225 |

(Continued)

OTHER PUBLICATIONS

PCT International Search Report and Written Opninion for PCT/US2016/061747, dated Jan. 26, 2017, 10 pages.

(Continued)

*Primary Examiner* — Khang Do
(74) *Attorney, Agent, or Firm* — Arent Fox LLP

(57) ABSTRACT

Systems and methods for facilitating a trusted platform module (TPM) or other protector mechanism that provides a device with a trusted device capability store. To provide the device with a trusted device capability store, a fingerprint of an endorsement key that is associated with the TPM or other protector mechanism can be imprinted into firmware of the device. By imprinting the fingerprint into the firmware, the device can determine whether or not the TPM or other protector mechanism the device is communicating with is the TPM or other protector mechanism associated with the device. The TPM or other protector mechanism can include the endorsement key, the trusted device capability store, and an access policy. The trusted device capability store can include one or more capabilities associated with the device. The access policy can indicate both unauthorized read access and authorized write access associated with the TPM or other protector mechanism.

18 Claims, 12 Drawing Sheets

(56) References Cited

U.S. PATENT DOCUMENTS

| | | | |
|---|---|---|---|
| 2005/0149733 A1* | 7/2005 | Catherman | G06F 21/57 |
| | | | 713/175 |
| 2005/0166051 A1 | 7/2005 | Buer | |
| 2005/0289350 A1 | 12/2005 | Schmidt-Karaca | |
| 2006/0242428 A1 | 10/2006 | Tarkkala | |
| 2007/0266422 A1 | 11/2007 | Germano et al. | |
| 2008/0040701 A1 | 2/2008 | Stern | |
| 2009/0031123 A1 | 1/2009 | Kruys | |
| 2009/0144434 A1* | 6/2009 | Tian | H04L 41/00 |
| | | | 709/228 |
| 2009/0327678 A1 | 12/2009 | Dutton et al. | |
| 2010/0095120 A1* | 4/2010 | Thom | H04L 9/3234 |
| | | | 713/170 |
| 2011/0099367 A1* | 4/2011 | Thom | H04L 9/0877 |
| | | | 713/156 |
| 2011/0166968 A1* | 7/2011 | Houng | H04N 5/44 |
| | | | 705/30 |
| 2011/0167503 A1* | 7/2011 | Horal | G06F 21/10 |
| | | | 726/33 |
| 2012/0096450 A1 | 4/2012 | Schaefer et al. | |
| 2013/0159704 A1 | 6/2013 | Chandrasekaran | |
| 2014/0004825 A1 | 1/2014 | Prakash et al. | |
| 2014/0281504 A1 | 9/2014 | Dasari et al. | |
| 2015/0170443 A1* | 6/2015 | Bower | G06F 21/105 |
| | | | 340/5.6 |
| 2015/0215309 A1 | 7/2015 | Aigner et al. | |
| 2016/0182238 A1* | 6/2016 | Dewan | H04L 9/3263 |
| | | | 713/171 |
| 2017/0041793 A1* | 2/2017 | Lee | H04L 41/28 |

OTHER PUBLICATIONS

"What's Changed in Security Technologies in Windows 8.1", Published on: Jul. 13, 2013, Available at: https://technet.microsoft.com/en-us/library/dn344918.aspx, 7 pages.

Camenisch, Jan, "Protecting (Anonymous) Credentials with the Trusted Computing Group's TPM V1.2", In Proceedings of the International Federation for Information Processing 21st International Information Security Conference, May 22, 2006, pp. 135-147.

"International Preliminary Report on Patentability Issued in PCT Application No. PCT/US2016/061747", dated Oct. 20, 2017, 6 Pages.

"Second Written Opinion Issued in PCT Application No. PCT/US2016/061747", dated Jul. 21, 2017, 5 Pages.

* cited by examiner

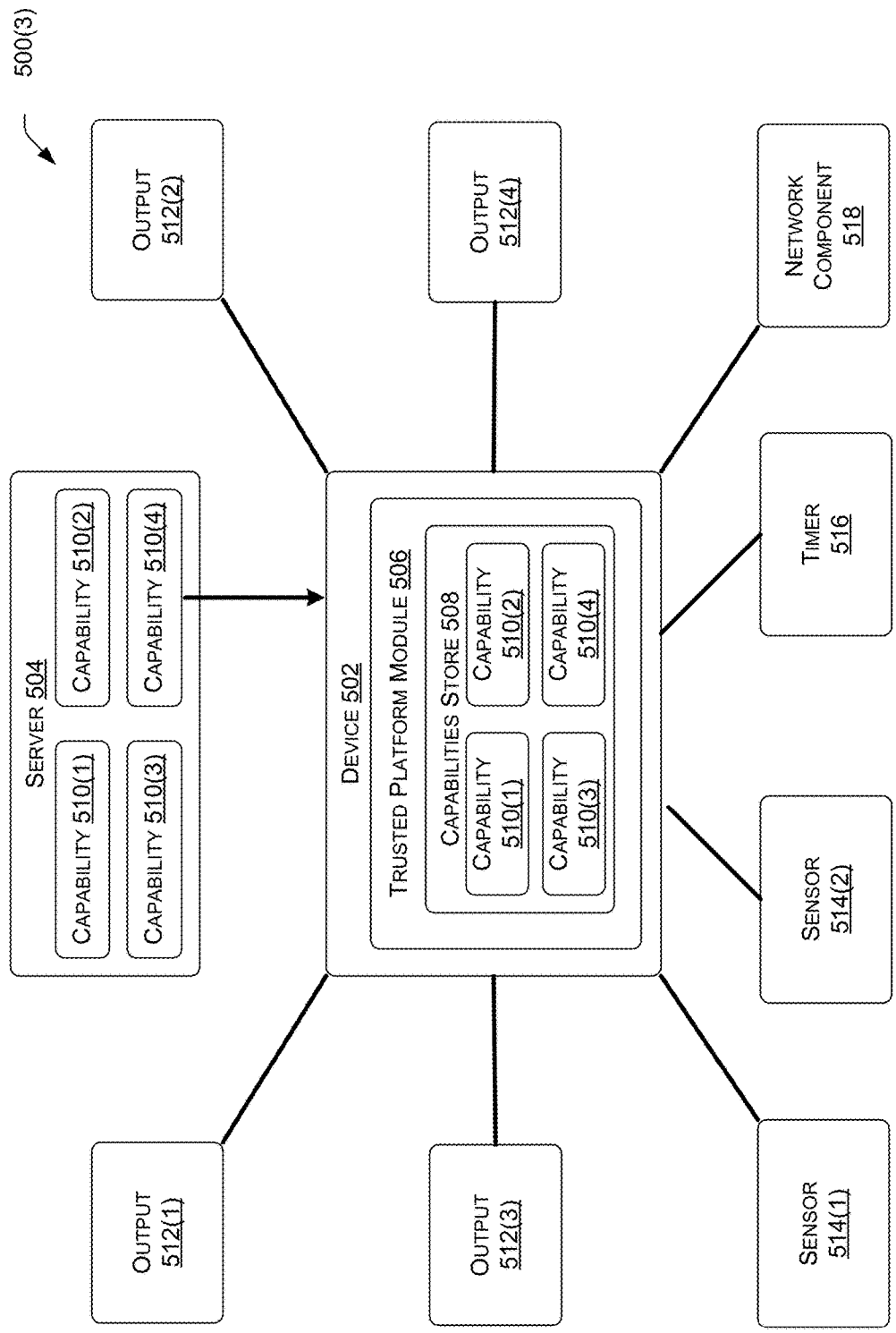

TAMPER PROOF DEVICE CAPABILITY STORE

BACKGROUND

Device manufacturers typically design devices to include various capabilities. Each of the capabilities associated with a device cause the device to perform a specific function, such as using a sensor on the device, providing an output, executing an application, executing a portion of an application, or the like.

Before providing the device to an end user, the manufacturer often will lock one or more of the capabilities on the device. Thus, the device may only be able to perform a limited number of the functions. In order to extend the capabilities of the device, the end user must then acquire access to one or more of the locked capabilities from the manufacturer. For instance, the user can use the device to purchase a locked capability from the manufacturer. The manufacturer can then cause the device to unlock the acquired capability. In response, the device can then perform the function that is associated with the acquired capability.

By only providing a limited number of the capabilities on the device when a user acquires the device, the manufacturer attempts to control what functions the device can perform. However, a user of the device with malicious intent may be able to unlock one or more of the locked capabilities on the device without acquiring the locked capabilities from the manufacturer. For instance, the user may copy an operating system (OS) image of a first device that has already unlocked one or more of the locked capabilities. The user can then use the OS image to unlock the one or more locked capabilities on a second device, which is a problem since the second device can utilize the one or more locked capabilities without acquiring the capabilities from the manufacturer.

SUMMARY

The techniques and constructs discussed herein are directed to a trusted platform module (TPM) or other protector mechanism that can provide a device with a trusted device capability store (i.e., tamper proof device capability store). To provide the device with a trusted device capability store, a fingerprint of an endorsement key that is associated with the TPM or other protector mechanism can be imprinted into firmware of the device. By imprinting the fingerprint into the firmware, the device can determine whether or not the TPM or other protector mechanism the device is communicating with is the TPM or other protector mechanism associated with the device. The TPM or other protector mechanism can include the endorsement key, the trusted device capability store, an access policy, etc. The trusted device capability store can record (e.g., store) one or more capabilities associated with the device. The access policy can indicate both unauthorized read access and authorized write access associated with the TPM or other protector mechanism. Therefore, in some examples, only an authorized entity that has access to a private key associated with the TPM, or other protector mechanism, access policy can write capabilities into the trusted device capability store and thus, provide the device with added capabilities.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 5A-5C depict an example environment of a device receiving one or more capabilities from a server and performing functions associated with the one or more capabilities.

DETAILED DESCRIPTION

Overview

Figure 1:
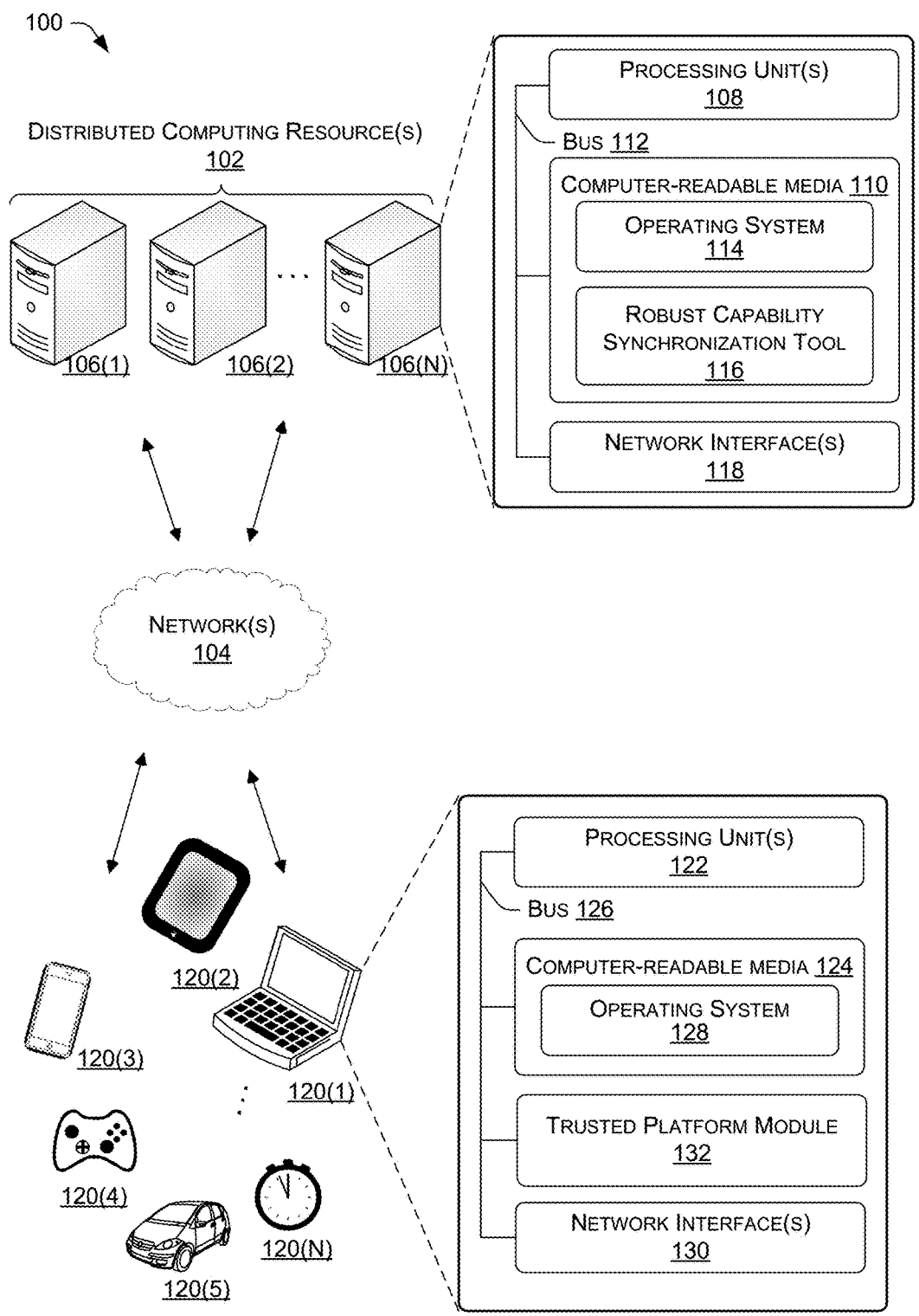
FIG. 1 is a block diagram depicting an example environment in which examples of a tamper proof device capability store can operate.

Examples described herein are directed to a trusted platform module (TPM), which can include other protector mechanisms, that can provide a device with a trusted device capability store. In various examples, the TPM or other protector mechanism comprises one or more of a hardware-based TPM or other secure hardware, a firmware-based TPM (fTPM) or other firmware-based protector, and/or a software-based TPM emulator or other software-based protector emulator. In some examples, a TPM can be a portable, removable device. For instance, the TPM can be a platform stored on a separate device that is able to be removably coupled to a device. The TPM can include a wired interface or a wireless interface, which is capable of interfacing with a device through an interface. In some examples, the TPM or other protector mechanism can include a computer-readable media, such as a non-volatile (NV) storage device. The computer-readable media of the TPM or other protector mechanism can include the trusted device capability store, an access policy, and an endorsement key (e.g., an endorsement certificate). Reading and writing data into the computer-readable media can be restricted by the access policy. In some examples, reading does not require authorization and writing does require authorization. For instance, in some examples, the access policy can indicate that an owner of the device can create and destroy objects (e.g., the trusted device capability store) within the computer-readable media of the TPM. In some examples, the access policy can indicate that only an authorized entity that includes an authority private key associated with the TPM, or other protector mechanism, access policy can write data (e.g., capabilities) into the computer-readable media of the TPM.

To secure the device capabilities using the TPM or other protector mechanism, in some examples, a fingerprint of the endorsement key can be imprinted into firmware on the device. Imprinting the fingerprint into the firmware can provide the device with an endorsement key name that the device can use to verify the TPM or other protector mechanism. For instance, the device can use the endorsement key name and an endorsement public key associated with the endorsement key to determine whether or not the device is communicating with the correct TPM or other protector mechanism on the device. In some examples, the device will only communicate with the TPM or other protector mechanism on the device. Therefore, a malicious user of the device cannot provide the device with a different TPM that includes additional capabilities that the device is not authorized to use.

The trusted device capability store can store capabilities associated with the device. In some examples, each of the device capabilities can cause the device and/or an application on the device to perform a specific function. For instance, a capability can cause the device to utilize a sensor associated with the device, execute an application on the device, execute a portion of an application on the device, unlock a feature of the device, provide a specific output, turn on or off servicing, troubleshooting or development capabilities, monitoring, logging, parental controls, or the like. In some examples, the capability can be associated with a credential or a generic usage time that expires after a set period of time or a set number of uses, which a user can the reacquire from a manufacturer. Therefore, in some examples, the device can only perform the specific feature associated with a capability when the trusted device capability store includes the capability.

In some examples, the access policy authorizes the device to create the trusted device capability store in the computer-readable media of the TPM or other protector mechanism. In some examples, the device creates the trusted device capability store using an authority public key associated with the TPM, or other protector mechanism, access policy. After creating the trusted device capability store, the device can communicate with an authorized entity to synchronize capabilities from the authorized entity with the trusted device capability store. For instance, the authorized entity can include a database that stores one or more capabilities associated with the device (i.e., capabilities for which the device is authorized). To synchronize the capabilities the authorized entity stores for the device with the trusted device capability store, the authorized entity can use the endorsement key to identify the device. The authorized entity can further use the authority public key associated with the trusted device capability store to verify the trusted device capability store on the device. The authorized entity can then identify the stored capabilities associated with the device from the database, and authorize a write operation corresponding to the stored capabilities for the device using the authority private key associated with the TPM or other protector mechanism.

Besides synchronizing capabilities using the authorized entity, the device can further add new capabilities to the trusted device capability store using the authorized entity. For instance, the device can communicate with the authorized entity to acquire an additional capability. In some examples, acquiring the additional capability can include purchasing the additional capability from the authorized entity. In response to acquiring the additional capability, the authorized entity can add the additional capability to the database of stored capabilities associated with the device. The authorized entity can then authorize a write operation corresponding to the additional capability for the device using the authority private key.

Additionally or alternatively, the authorized entity can remove one or more capabilities form the trusted device capability store. For instance, if the trusted device capability store on the device includes a capability that is not included in the database of stored capabilities, the authorized entity can remove the capability from the trusted device capability store when the device synchronizes with the authorized entity. In some examples, the authorized entity can cause the device to synchronize with the authorized entity at a given time interval or before a given number of capabilities reads. Once synchronized, the authorized entity can authorize a write operation that removes the capability from the trusted device capability store.

In some examples, the device and/or an application on the device can further utilize one or more capabilities from the trusted device capability store. To utilize capabilities, the device and/or the application can verify the TPM or other protector mechanism using the endorsement public key as discussed above. Additionally, the device and/or the application can further verify the trusted device capability store using the authority public key associated with the trusted device capability store. The device and/or the application can then read the capabilities from the trusted device capability store and execute the appropriate functions based on the capabilities.

It should be noted that, in some examples, more than one authorized entity can authorize write operations for writing capabilities into the trusted device capability store and/or removing capabilities from the trusted device capability store. For instance, in some examples, in order to add capabilities to and/or remove capabilities from the trusted device capability store, an authorized entity needs the authority private key associated with the TPM or other protector mechanism to sign authorized write operations associated with the capabilities. Therefore, a manufacturer of the device and/or a manufacturer of an application on the device can provide more than one authorized entity with the authority private key. Each of the authorized entities that includes the authority private key can then authorize write operations to add and/or remove capabilities from the trusted device capability store.

Moreover, the descriptions herein are not limited to using a TPM or other protector mechanism to provide the device with a trusted device capability store. In some examples, any portable and/or non-portable hardware security device that performs operations similar to the TPM or other protector mechanism described herein can provide the device with a trusted device capability store. For instance, in some examples, a secure cryptoprocessor that provides a device with data encryption and/or other secure computing services (e.g., remote attestation, sealed storage, or the like) can provide the device with a trusted device capability store using the operations described herein. In some examples, the secure cryptoprocessor can include a portable and/or non-portable hardware security device.

Additionally, in some examples, the computer-readable media that stores the endorsement key, trusted device capability store, and access policy can be separate from the TPM or other protector mechanism. The TPM or other protector mechanism can then utilize the separate computer-readable media in order to perform the operations described herein. In some examples, one or more of the endorsement key, trusted device capability store, and/or access policy can be stored on a computer-readable media that is separate from the computer-readable media of the TPM or other protector mechanism.

Various examples, scenarios, and aspects are described further with reference to FIGS. 1-10.

Illustrative Environment

FIG. 1 shows an example environment 100 in which a trusted device capability store can operate. In some examples, the various devices and/or components of environment 100 include distributed computing resource(s) 102 that can communicate with one another and with external devices via one or more network(s) 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). For instance, support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(N). Examples support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile devices, special purpose-type devices, embedded-type devices, and/or wearable-type devices. Thus, although illustrated as desktop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, thin clients, terminals, work stations, integrated components for inclusion in a computing device, or any other sort of computing device.

Device(s) 106 can include any type of computing device having one or more processing unit(s) 108 operably connected to computer-readable media 110 such as via a bus 112, which in some instances can include one or more of a system bus, a data bus, an address bus, a PCI bus, a Mini-PCI bus, and any variety of local, peripheral, and/or independent buses. Executable instructions stored on computer-readable media 110 can include, for example, an operating system 114, a robust capability synchronization tool 116, and other modules, programs, or applications that are loadable and executable by processing units(s) 108. Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Device(s) 106 can also include one or more network interface(s) 118 to enable communications between computing device(s) 106 and other networked devices, such as client computing device(s) 120 involved in providing the trusted device capability store, or other devices over network(s) 104. Such network interface(s) 118 can include one or more network interface controllers (NICs) or other types of transceiver devices to send and receive communications over a network. For simplicity, other components are omitted from the illustrated device(s) 106.

Other devices involved in facilitating a trusted device capability store can include client computing devices 120(1)-120(N). Device(s) 120 can belong to a variety of categories or classes of devices such as traditional client-type devices, desktop computer-type devices, mobile devices, special purpose-type devices, embedded-type devices, Internet of Things (IoT) devices, and/or wearable-type devices. By way of example and not limitation, computing device(s) 120 can include, but are not limited to, server computers or blade servers such as Web servers, map/reduce servers or other computation engines, or network-attached-storage units, laptop computers, thin clients, terminals, or other mobile computers (e.g., 120(1)), computer navigation client computing devices, satellite-based navigation system devices including global positioning system (GPS) devices and other satellite-based navigation system devices, personal data assistants (PDAs), and other specialized portable electronic devices, tablet computers or tablet hybrid computers (e.g., 120(2)), smartphones, mobile phones, mobile phone-tablet hybrid devices, or other telecommunication devices (e.g., 120(3)), portable or console-based gaming devices or other entertainment devices such as network-enabled televisions, set-top boxes, media players, cameras, or personal video recorders (PVRs) (e.g., 120(4), represented graphically as a gamepad), automotive computers such as vehicle control systems, vehicle security systems, or electronic keys for vehicles (e.g., 120(5), represented graphically as an automobile), wearable computers such as smart watches or biometric or medical sensors, implanted computing devices such as biometric or medical sensors, or fixed sensors, such as IoT sensors, configured to monitor time, environmental conditions, vibration, motion, or other attributes of the world or structures or devices therein, e.g., bridges or dams (e.g., 120(N), represented graphically as a clock) desktop computers, or integrated components for inclusion in computing devices, appliances, or other computing device(s).

Client computing device(s) 120 can represent any type of computing device having one or more processing unit(s) 122 operably connected to computer-readable media 124 such as via a bus 126, which in some instances can include one or more of a system bus, a data bus, an address bus, a PCI bus, a Mini-PCI bus, and any variety of local, peripheral, and/or independent buses.

Executable instructions stored on computer-readable media 124 can include, for example, an operating system 128, and other modules, programs, or applications that are loadable and executable by processing units(s) 122. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Device(s) 120 can also include one or more network interface(s) 130 to enable communications between device(s) 120 and other networked devices such as other device(s) 120 or device(s) 106 over network(s) 104. Such network interface(s) 130 can include one or more network interface controllers (NICs) or other types of transceiver devices to send and receive communications over a network.

Device(s) 120 can also include a TPM or other protector mechanism 132. TPM or other protector mechanism 132 can provide device(s) 120 with a trusted device capability store. For instance, TPM or other protector mechanism 132 can include the trusted device capability store that stores one or more capabilities associated with device(s) 120. Additionally, TPM or other protector mechanism 132 can include an endorsement key that identifies TPM or other protector mechanism 132 and/or device(s) 120, and an access policy that can indicate both unauthorized read access and authorized write access associated with TPM or other protector mechanism 132.

Figure 2:
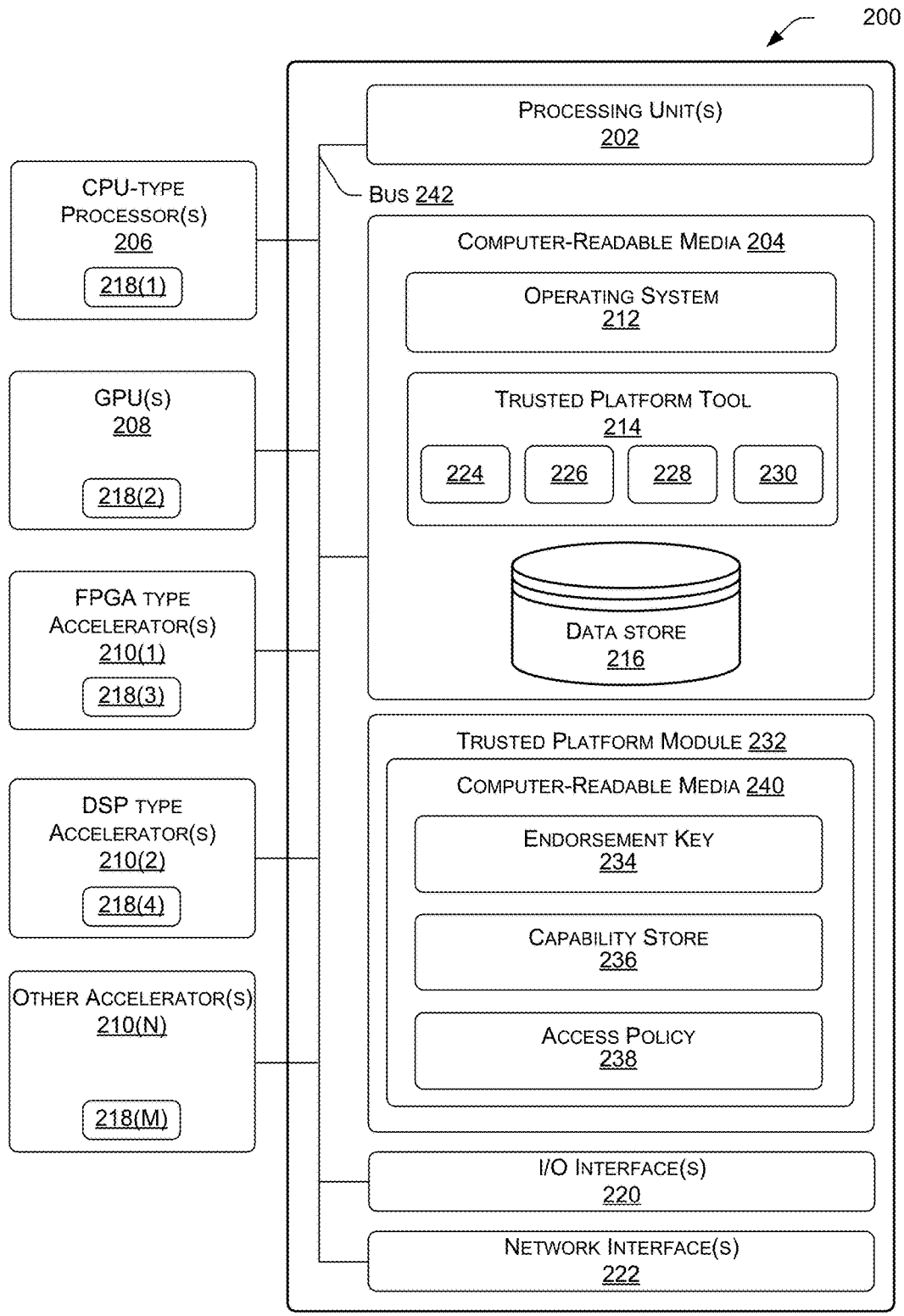
FIG. 2 is a block diagram depicting an example computing 120 device of FIG. 1.

FIG. 2 is a block diagram depicting an example client computing device 200, such as a client device 120 from FIG. 1. In device(s) 200, processing unit(s) 202 can include processing unit(s) 122 and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In the illustrated example, computer-readable media 204 can represent computer-readable media 124, and can store instructions executable by processing unit(s) 202. Computer-readable media 204 can also store instructions executable by an external CPU-type processor 206, executable by a GPU 208, and/or executable by an accelerator 210, such as an FPGA type accelerator 210(1), a DSP type accelerator 210(2), or any internal or external accelerator 210(N). In various examples at least one GPU 208 and/or accelerator 210 is incorporated in device 200, while in some examples one or more of GPU 208 and/or accelerators 210 are external to device 200, as illustrated in FIG. 2. Executable instructions stored on computer-readable media 204 can include, for example, an operating system 212, a trusted platform tool 214, and other modules, programs, or applications that are loadable and executable by processing units(s) 202, 206, 208 and/or 210.

In the illustrated embodiment, computer-readable media 204 also includes a data store 216. In some examples, data store 216 can include data storage such as a database, data warehouse, or other type of structured or unstructured data storage. In some examples, data store 216 can include a relational database with one or more tables, indices, stored procedures, and so forth to enable data access. Data store 216 can store data for the operations of processes, applications, components, and/or modules stored in computer-readable media 204 and/or executed by processor(s) 202, 206, and/or 208, and/or accelerator(s) 210. Alternately, some or all of the above-referenced data can be stored on separate memories 218, such as a memory 218(1) on board a CPU type processor 206, memory 218(2) on board a GPU 208, memory 218(3) on board an FPGA type accelerator 210(1), memory 218(4) on board a DSP type accelerator 210(2), and/or memory 218(M) on board another accelerator 210(N).

Device(s) 200 can further include one or more input/output (I/O) interfaces 220 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 200, network interface(s) 222, which can include network interface(s) 130, can represent, for example, network interface controllers (NICs) or other types of transceiver devices to send and receive communications over a network.

In the illustrated example, computer-readable media 204 can include trusted platform tool 214. Trusted platform tool 214 can include one or more modules and/or APIs, which are illustrated as blocks 224, 226, 228, and 230, although this is just an example, and the number can vary higher or lower.

Functionality associated with blocks 224, 226, 228, and 230 can be combined to be performed by a fewer number of modules and/or APIs, or it can be split and performed by a larger number of modules and/or APIs. For example, block 224 can represent a verification module with logic to program processing unit(s) 202 of device 200 to perform the verification operations described herein for device 200. In some examples, device 200 can execute verification module 224 to verify TPM or other protector mechanism 232. For instance, a fingerprint of an endorsement key 234 associated with TPM or other protector mechanism 232 can be imprinted into the firmware of device 200. In some examples, the fingerprint is imprinted into the firmware of device 200 when the device 200 is manufactured. Imprinting the fingerprint into the firmware can provide device 200 with an endorsement key name (e.g., a digest of endorsement key 234) that device 200 can use to verify TPM or other protector mechanism 232. Device 200 can then execute verification module 224 to verify TPM or other protector mechanism 232 using the endorsement key name and endorsement key 234.

For instance, in some examples, device 200 (and/or a system on chip (SoC) of a device) can execute verification module 224 to receive an endorsement public key associated with endorsement key 234 from TPM or other protector mechanism 232 and verify that the endorsement public key matches the endorsement key name. Device 200 can then cause verification module 224 to encrypt a secret using the endorsement public key and send the encrypted secret to TPM or other protector mechanism 232. In some examples, the secret can include an ephemeral secret that TPM or other protector mechanism 232 and device 200 (and/or SoC of device) use during communication session. In response, TPM or other protector mechanism 232 can decrypt the encrypted secret using endorsement key 234 to generate a hash-based authentication code (and/or other secret), and send the hash-based authentication code back to verification module 224. Since verification module 224 encrypts the secret using the endorsement public key, only a TPM or other protector mechanism that includes endorsement key 234 can decrypt the secret. As such, verification module 224 can verify that TPM or other protector mechanism 232 is the correct TPM or other protector mechanism that is associated with device 200 by receiving the hash-based authentication code from TPM or other protector mechanism 232.

Device 200 can further execute verification module 224 to verify a capability store 236 in TPM or other protector mechanism 232. In some examples, device 200 can verify capability store 236 before reading content from capability store 236. To verify capability store 236, verification module 224 can determine that an authority public key that allows authorized entities to write capabilities into the capability store 236 matches the capability store 236. In some examples, device 200 creates capability store 236 using the authority public key. As such, capability store 236 references the authority public key after capability store 236 is created by device 200.

Block 226 can represent a store creation module with logic to program processing unit(s) 202 of device 200 for creating capability stores within TPM or other protector mechanism 232. For instance, TPM or other protector mechanism 232 can include access policy 238, which can restrict reading data from TPM or other protector mechanism 232 and writing data into TPM or other protector mechanism 232. In some examples, access policy 238 can indicate that an owner of device 200 can create and destroy objects within TPM or other protector mechanism 232, such as capability store 236. As such, device 200 can utilize store creation module 226 to create capability store 236 in TPM or other protector mechanism 232. In some examples, device 200 can further utilize store creation module 226 to remove capability store 236 from TPM or other protector mechanism 232.

In some examples, store creation module 226 can create capability store 236 without any outside authorization. For instance, store creation module 226 can create capability store 236 using one or more store properties. Store creation module 226 can determine the one or more store properties using access policy 238, endorsement key 234 and/or the authority public key. TPM or other protector mechanism 232 can then enforce the one or more properties by only allowing an authorized authority subsequently write to capability store 236. For instance, in some examples, TPM or other protector mechanism 232 will only let an authority that has the authority private key write to capability store 236 based on the one or more store properties.

Block 228 can represent a reading module with logic to program processing unit(s) 202 of device 200 for reading data from TPM or other protector mechanism 232. For instance, device 200 can execute reading module 228 to read content from capability store 236. The content can include one or more capabilities stored in capability store 236. In some examples, device 200 causes reading module 228 to read the content from capability store 236 in response to receiving a request from a user to perform a function of device 200 that requires an acquired capability. In some examples, device 200 causes reading module 228 to read content from capability store 236 in response to receiving a request from an application on device 200 to perform a function associated with the application that requires an acquired capability. In either of the examples, device 200 can cause reading module 228 to read the content in order to verify that device 200 has acquired the capability associated with the requested function.

Block 230 can represent a capability writing module with logic to program processing unit(s) 202 of device 200 for writing capabilities into capability store 236. For instance, after device 200 receives authorization to write a capability into capability store 236 (such as from a server), device 200 can use capability writing module 230 to write the capability into capability store 236. In some example, device 200 can further use capability writing module 230 to remove a capability from capability store 236.

Also illustrated in FIG. 2, device 200 includes TPM or other protector mechanism 232. TPM or other protector mechanism 232 can include computer-readable media 240 that stores endorsement key 234, capability store 236, and access policy 238. In some examples, computer-readable media 240 can include a non-volatile (NV) storage device.

Device 200 can use endorsement key 234 to verify TPM or other protector mechanism 232. For instance, in some examples, device 200 can use endorsement key 234 and a fingerprint of endorsement key 234 imprinted in the firmware of device 200 to verify TPM or other protector mechanism 232. Device 200 can verify TPM or other protector mechanism 232 before reading content from TPM or other protector mechanism 232. Additionally, in some examples, an authorized entity can use endorsement key 234 to verify device 200 and/or TPM 232 before synchronizing with TPM or other protector mechanism 232.

Capability store 236 can include an index of one or more capabilities associated with device 200. For instance, after synchronizing TPM or other protector mechanism 232 with an authorized entity, capability store 236 can include each of the capabilities that the authorized entity stores for device 200 in a database. In some examples, device 200 can be pre-configured to include one or more capabilities when a user acquires device 200. In such examples, device 200 can receive these pre-configured capabilities when device 200 first synchronizes TPM or other protector mechanism 232 with the authorized entity. Additionally or alternative, in some examples, device 200 can acquire additional capabilities from the authorized entity. In such examples, the authorized entity provides device 200 with the additional capabilities by adding the capability to its database and synchronizing the database with TPM or other protector mechanism 232.

Access policy 238 can restrict which devices and/or entities can read data from computer-readable media 240, and also which devices and/or entities can write data into computer-readable media 240. For instance, in some examples, access policy 238 can indicate that an owner of device 200 can create and destroy objects within computer-readable media 240, such as capability store 236. In some examples, access policy 238 can indicate that only an authorized entity that includes an authority private key associated with TPM or other protector mechanism 232 can write data into computer-readable media 240. As such, in such examples, device 200 cannot write data into capability store 236, thus adding capabilities to device 200, since device 200 does not include the authority private key associated with TPM or other protector mechanism 232.

It should be noted that FIG. 2 illustrates TPM or other protector mechanism 232 as including a discrete hardware device attached to device 200. In some examples, a manufacturer of device 200 solders TPM or other protector mechanism 232 on device 200 during manufacturing of device 200. In some examples, TPM or other protector mechanism 232 may include a portable hardware device that attaches to and detaches from device 200. In such examples, a fingerprint of endorsement key 234 can still be imprinted in the firmware of device 200. As such, device 200 can verify that TPM or other protector mechanism 232 is the correct TPM or other protector mechanism 232 that is associated with device 200 when TPM or other protector mechanism 232 is attached to device 200.

Additionally, device 200 is not limited to only using a TPM; device 200 can use another protector mechanism 232 for securing capabilities within capability store 236. In some examples, device 200 can use any portable and/or non-portable hardware security device an another protector mechanism that performs operations similar to TPM 232 described herein to provide device 200 with capability store 236. For instance, in some examples, a secure cryptoprocessor that provides device 200 with data encryption and/or other secure computing services (e.g., remote attestation, sealed storage, or the like) can provide device 200 with capability store 236 using the operations described herein. In some examples, the secure cryptoprocessor can include a portable and/or non-portable hardware security device.

Also illustrated in FIG. 2 is bus 242, which can include bus 126, and which in some instances can include one or more of a system bus, a data bus, an address bus, a PCI bus, a Mini-PCI bus, and any variety of local, peripheral, and/or independent buses, can operably connect computer-readable media 204 to processing unit(s) 202. Additionally, in some examples, bus 242 can include one or more of a system bus, a data bus, an address bus, a PCI bus, a Mini-PCI bus, and any variety of local, peripheral, and/or independent buses, can operably connect computer-readable media 204 to one or more of CPU-Type processor(s) 206, GPU(s) 208, FPGA type accelerator(s) 210(1), DSP type accelerator(s) 210(2), or other accelerator(s) 210(N).

Figure 3:
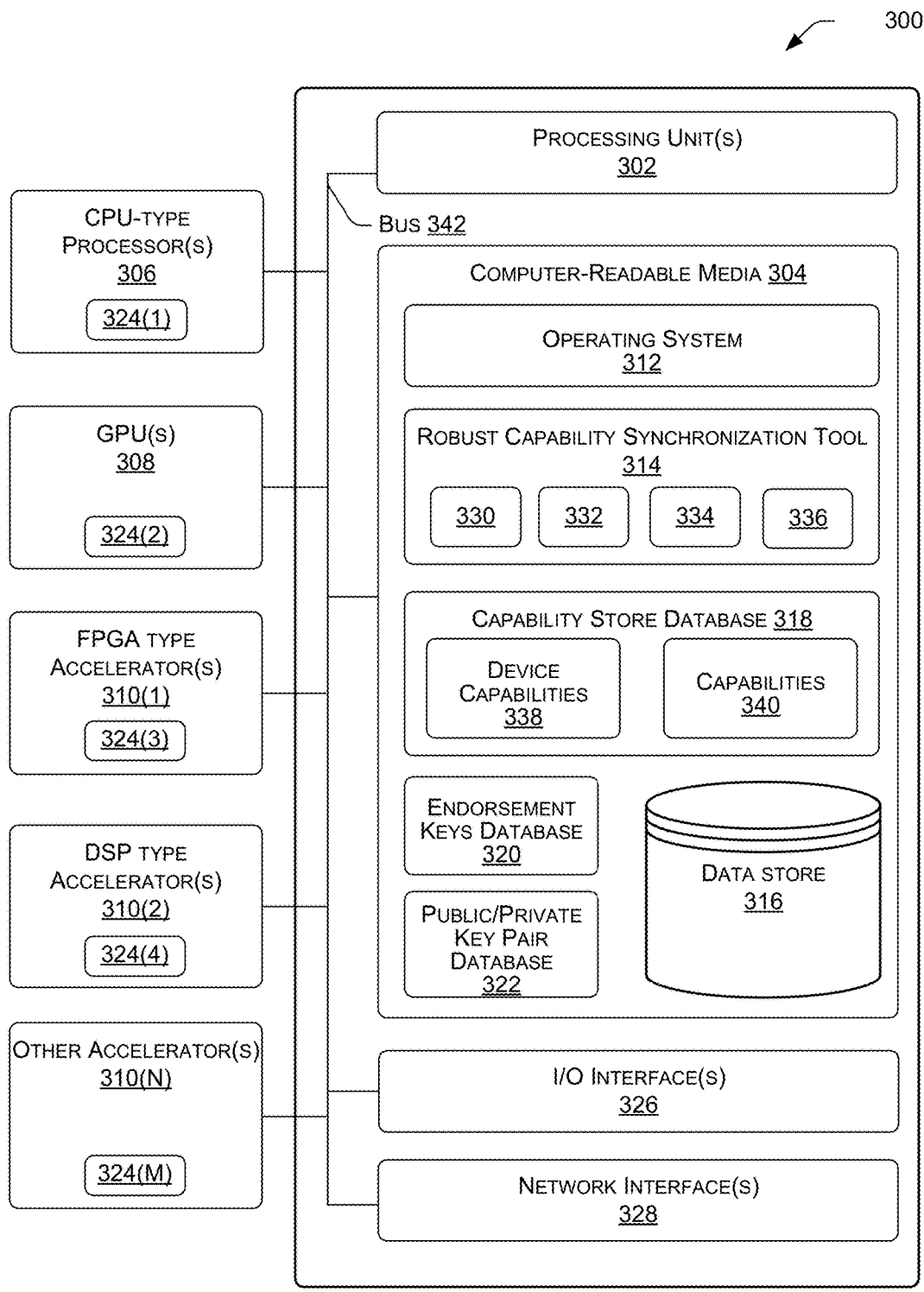
FIG. 3 is a block diagram depicting an example computing device 106 of the distributed computing resource(s) 102 of FIG. 1.

FIG. 3 is a block diagram depicting an example computing device 300 of a distributed computing resource, such as a device 106 from FIG. 1. In device(s) 300, processing unit(s) 302, can include processing unit(s) 108 and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In the illustrated example, computer-readable media 304 can represent computer-readable media 110, and can store instructions executable by processing unit(s) 302. Computer-readable media 304 can also store instructions executable by an external CPU-type processor 306, executable by a GPU 308, and/or executable by an accelerator 310, such as an FPGA type accelerator 310(1), a DSP type accelerator 310(2), or any internal or external accelerator 310(N). In various examples at least one GPU 308 and/or accelerator 310 is incorporated in device 300, while in some examples, one or more of GPU 308 and/or accelerators 310 are external to device 300, as illustrated in FIG. 3. Executable instructions stored on computer-readable media 304 can include, for example, an operating system 312, a robust capability synchronization tool 314, and other modules, programs, or applications that are loadable and executable by processing units(s) 302, 306, 308 and/or accelerator(s) 310.

In the illustrated embodiment, computer-readable media 304 also includes a data store 316. In some examples, data store 316 can include data storage such as a database, data warehouse, or other type of structured or unstructured data storage. In some examples, data store 316 can include a relational database with one or more tables, indices, stored procedures, and so forth to enable data access. Data store 316 can store data for the operations of processes, applications, components, and/or modules stored in computer-readable media 304 and/or executed by processor(s) 302, 306, and/or 308, and/or accelerator(s) 310. For instance, in some examples, data store 316 can store one or more of capability store database 318, endorsement keys database 320, and/or public/private key pair database 322. Additionally or alternatively, some or all of the above-referenced data can be stored on separate memories 324, such as a memory 324(1) on board a CPU type processor 306, memory 324(2) on board a GPU 308, memory 324(3) on board an FPGA type accelerator 310(1), memory 324(4) on board a DSP type accelerator 310(2), and/or memory 324(M) on board another accelerator 310(N).

Device(s) 300 can further include one or more input/output (I/O) interfaces 326 to allow device 300 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 300, network interface(s) 328, which can include network interface(s) 118, can represent, for example, network interface controllers (NICs) or other types of transceiver devices to send and receive communications over a network.

In the illustrated example, computer-readable media 304 can include a robust capability synchronization tool 314, which can include robust capability synchronization tool 116. Robust capability synchronization tool 314 can include one or more modules and/or APIs, which are illustrated as blocks 330, 332, 334, and 336, although this is just an example, and the number can vary higher or lower.

Functionality associated with blocks 330, 332, 334, and 336 can be combined to be performed by a fewer number of modules and/or APIs, or it can be split and performed by a larger number of modules and/or APIs. For example, block 330 can represent a verification module with logic to program processing unit(s) 302 of device 300 for performing the verification operations described herein for device 300. For instance, device 300 can execute verification module 330 to verify a device(s) 200 and/or TPM or other protector mechanism 232 associated with device 200. To verify device 200, verification module 330 can receive an endorsement public key from device 200 and search through endorsement keys database 320 using the endorsement public key. Endorsement keys database 320 can include a database of stored endorsement keys for devices that device 300 is authorized to issue write operations for. For instance, in some examples, a manufacturer of devices can store the endorsement key for each of the devices that the manufacturer provides. As such, verification module 330 can verify device 200 based on the endorsement public key from the device 200 matching one of the endorsement keys stored within endorsement keys database 320.

Additionally, device 300 can execute verification module 330 to verify a TPM or other protector mechanism and/or a capability store associated with device 200. For instance, and as illustrated in FIG. 3, device 300 can include public/private key pair database 322. Public/private key pair database 322 can store one or more authority private keys that device 300 uses to sign authorized write operations, which are discussed below. As such, to verify the TPM or other protector mechanism or capability store on the TPM or other protector mechanism, verification module 330 can read (e.g., receive) a public portion of the computer-readable media (e.g., NV storage device) of the TPM or other protector mechanism. When reading the public portion, verification module 330 can verify the access policy for writing on metadata associated with computer-readable media matches an authority public key of a stored authority private key from public/private key pair database 322.

Block 332 can represent a synchronization module with logic to program processing unit(s) 302 of device 300 for performing the synchronization operations described herein for device 300. In some examples, device 300 can execute synchronization module 332 to synchronize stored capabilities associated with a device 200 with a TPM or other protector mechanism. For instance, synchronization module can receive a synchronization request from device 200. Synchronization module 332 can then use an identity of device 200 (verified above) to search through device capabilities 338. Device capabilities 338 can include an index of registered TPMs or other protector mechanisms and/or registered computer-readable media associated with the TPMs or other protector mechanisms which synchronization module 332 can use to identify devices. Additionally, device capabilities 338 can include a list of one or more capabilities that are associated with each of the indexed devices. For instance, in some examples, device capabilities 338 can include a list of capabilities for each of the devices that device 300 stores an authority private key for in public/private key pair database 322. Synchronization module 332 can then issue one or more of the capabilities for device 200.

In addition to issuing capabilities for a device (such as one of device(s) 120 of FIG. 1 and/or device 200 of FIG. 2), device 300 can execute synchronization module 332 to add new capabilities for a device 200 in device capabilities 338 and issue the new capabilities to device 200. For instance, synchronization module 332 can receive a request from device 200 for one of capabilities 340 for an endorsement key in the capability store database 318. Capabilities 340 can include each of the capabilities that device 200 can acquire from device 300. In some examples, capabilities 340 can include a list of capabilities that a user of a device can search through and purchase for device 200. Synchronization module 332 can then provision a capability from device capabilities 338 for device 200. Additionally, synchronization module 332 can issue the provisioned capability for the device.

Moreover, the device 300 can execute synchronization module 332 to remove capabilities from a device 200. For instance, during synchronization with a TPM or other protector mechanism of device 200, synchronization module 332 can determine that the capability store includes one or more capabilities that are not included in device capabilities 338 for device 200. Synchronization module 332 can then issue a command to remove the one or more additional capabilities from the capability store.

Block 334 can represent an authorization module with logic to program processing unit(s) 302 of device 300 for authorizing write operations for a device 200. For instance, after issuing a capability for device 200, device 300 can execute authorization module 334 to authorize a write operation that includes data associated with the capability for device 200. In some examples, to authorize the write operation, authorization module 334 generates the write operation by signing a write command with the authority private key that is associated with device 200 that is acquiring the capability. Authorization module 334 can then provide the TPM or other protector mechanism of device 200 with the authorized write operation. In some examples, providing the TPM or other protector mechanism with the authorized write operation causes the TPM or other protector mechanism to write the capability into the capability store.

Additionally, in some examples, authorization module 334 can authorize a write operation that removes a capability from a device 200. Authorization module 334 can then provide the TPM or other protector mechanism of device 200 with the authorized write operation. In some examples, providing the TPM or other protector mechanism with the authorized write operation causes the TPM or other protector mechanism to remove the capability from the capability store.

Block 336 can represent a device capability expansion module with logic to program processing unit(s) 302 of device 300 for expanding capabilities for a device 200. For instance, device capabilities 338 may include each of the capabilities that device 200 is originally provisioned with when device 200 is manufactured. Device 300 can then use device capability expansion module 336 to add new capabilities to device capabilities 338 when a new capability is created and/or manufactured for device 200. In some examples, device 200 can then acquire the new capabilities that are added to device capabilities 338.

Also illustrated in FIG. 3 is bus 342, which can include bus 116, and which in some instances can include one or more of a system bus, a data bus, an address bus, a PCI bus, a Mini-PCI bus, and any variety of local, peripheral, and/or independent buses, can operably connect computer-readable media 304 to processing unit(s) 302.

Computer-readable media described herein, e.g., computer-readable media 110, 124, 204, 240, and 304, includes computer storage media and/or communication media. In some examples, computer-readable media is specifically described as non-volatile memory. Otherwise, computer storage media includes tangible storage units such as volatile memory, non-volatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a corresponding computing device.

In contrast to computer storage media, communication media can embody computer-readable instructions, data structures, program modules, or other data in a modulated data signal, such as a carrier wave, or other transmission mechanism. As defined herein, computer storage media does not include communication media.

Figure 4:
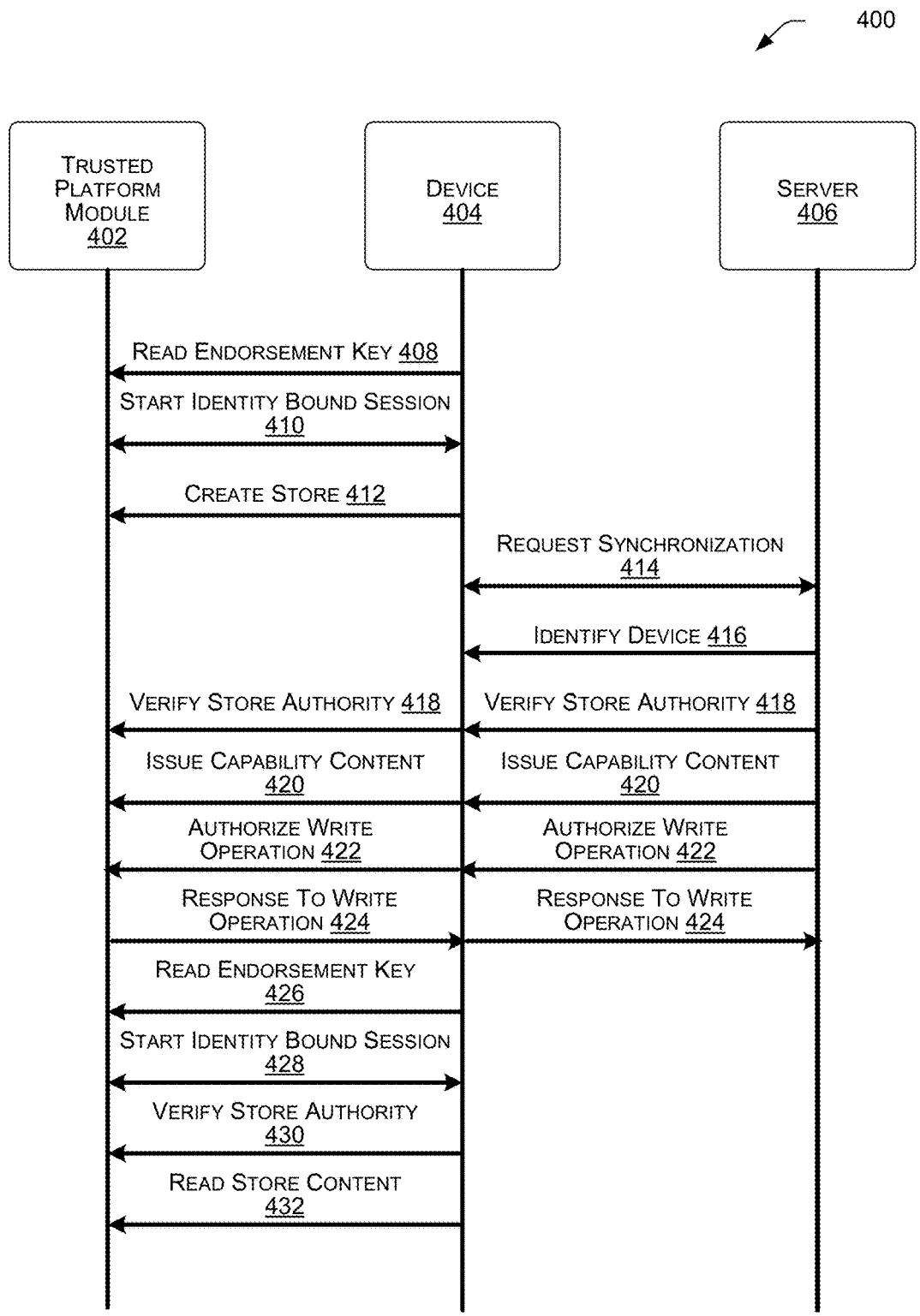
FIG. 4 is a flow diagram of an illustrated process for providing a trusted device capability store on a device.

FIG. 4 is a flow diagram of an illustrated process for providing a trusted device capability store on a device. In the example of FIG. 4, TPM 402 can represent TPM or other protector mechanism 132 from FIG. 1 and/or TPM or other protector mechanism 232 from FIG. 2. Device 404 can represent one of device(s) 120 from FIG. 1 and/or device 200 from FIG. 2. Additionally, server 406 can represent one or more of device(s) 106 from FIG. 1 and/or device 300 from FIG. 3.

At 408, device 404 can read the endorsement key associated with TPM 402. For instance, TPM 402 can send an endorsement public key associated with the endorsement key to device 404. Device 404 can then verify the endorsement public key using an endorsement key name. In some examples, the endorsement key name can be associated with a fingerprint of the endorsement key, and imprinted in the firmware of device 404. For instance, the endorsement key name can include a digest of the endorsement key.

At 410, device 404 and TPM 402 can start an identity bound session. To start the identity bound session, device 404 can encrypt a secret using the endorsement public key. Device 404 can then use the encrypted secret to verify TPM 402. For instance, device 404 can send the encrypted secret to TPM 402. In response, TPM 402 can decrypt the encrypted secret using the endorsement key and send the decrypted secret back to device. A device that includes the endorsement key associated with the endorsement public key can decrypt the encrypted secret. As such, device 404 can verify TPM 402 when TPM 402 decrypts the encrypted secret. In some examples, the decrypted secret includes a hash-based authentication code. After starting the identity bound session, device 404 can issue commands to TPM 402 through the identity bound session.

At 412, device 404 can create a capability store in TPM 402. In some examples, device 404 creates the capability store within a NV storage device of TPM 402 using an authority public key. As such, in some examples, authorization to write to the capability store references the authority public key. For instance, only an authorized entity that includes an authority private key that is associated with the authority public key is authorized write to the capability store.

At 414, one or more of device 404 or server 406 can request synchronization of device capabilities between the capability store and server 406. For instance, in some examples, in response to creating the capability store, device 404 can request to synchronize the capability store with the capabilities that server 406 stores in a database for device 404. In some examples, server 406 can cause device 404 to synchronize the capability store with server 406 at given time intervals, such as every day, week, month, or the like.

At 416, server 406 can identify device 404. For instance, device 404 can send an endorsement public key associated with the TPM's 402 endorsement key to server 406. Server 406 can then use the endorsement public key to search through a database of stored endorsement keys to identify device 404. In some examples, identifying device 404 can include identifying the stored endorsement key that is associated with TPM 402 on device 404 using the endorsement public key.

At 418, server 406 can verify the store authority for the capability store. In some examples, verifying a store authority can include reading metadata associated with the NV storage device from TPM 402 and determining whether a policy on the metadata matches an authority public key of an authority private key that server 406 stores for TPM 402. After verifying the store authority, server 406 can then search through a database of stored device capabilities to determine one or more capabilities for device 404. For instance, server 406 can use an identity of device 404 to search through the database. In some examples, device 404 has already acquired the one or more capabilities stored in the database for device 404.

At 420, server 406 can issue capability store content for device 404 and at 422, server 406 can authorize a write operation for device 404. For instance, server 406 can generate a authorized write operation associated with the one or more capabilities that are stored in the database for device 404 by signing a write command using the authority private key for device 404. Server 406 can then send the authorized write operation to TPM 402. In some examples, TPM 402 verifies the signature of the authority private key using the authority public key before writing (e.g., storing) the one or more capabilities into the capability store.

At 424, TPM 402 can send server 406 a response to the write operation. For instance, in some examples, the response can include a communication that includes a nonce. The communication can verify that the one or more capabilities were written into the capability store.

At 426, device 404 can again read the endorsement key associated with TPM 402, as discussed above, and at 428, device 404 and TPM 402 can start an identity bound session. To start the identity bound session, device 404 can again encrypt a secret using the endorsement public key. Device 404 can use the encrypted secret to verify TPM 402. For instance, device 404 can then send the encrypted secret to TPM 402. In response, TPM 402 can decrypt the encrypted secret using the endorsement key and send the decrypted secret back to device. In some examples, the decrypted secret includes a hash-based authentication code.

At 430, device 404 can verify the store authority associated with the capability store. For instance, device 404 can verify the store authority using the authority public key. In some examples, verifying the store authority can include determining that the authority public key that allows authorized entities to write to the capability store matches the capability store.

At 432, device 404 can read the content from the capability store. In some examples, device 404 reads the content from the capability store in response to receiving a request from a user to perform a function of device 404 that requires an acquired capability in order for device 404 to perform the function. In some examples, device 404 reads content from the capability store in response to receiving a request from an application on device 404 to perform a function associated with the application that requires an acquired capability in order for the application to perform the function.

Figure 5A:
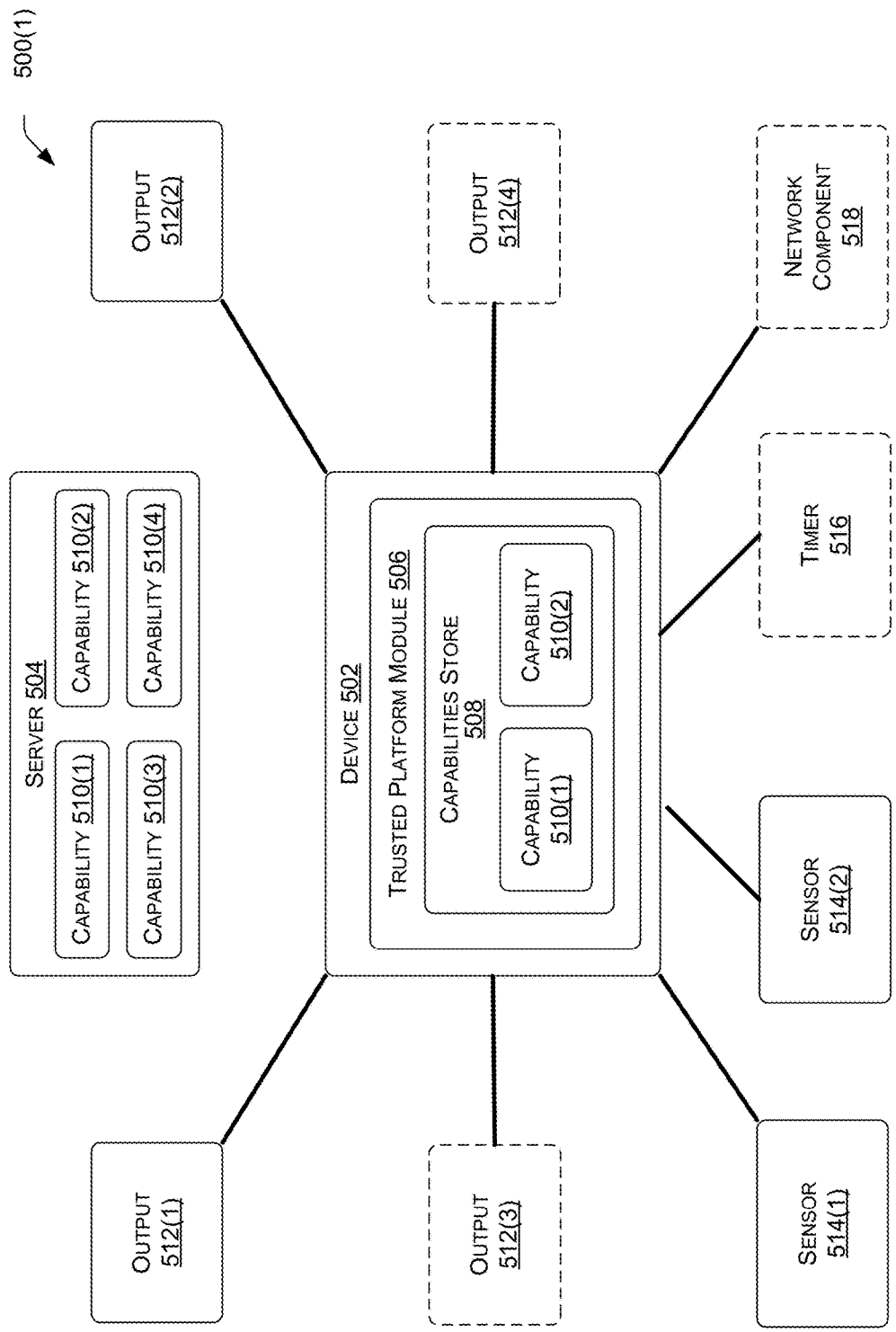

FIG. 5A depicts a first example environment 500(1) of device 502 receiving one or more capabilities from server 504 and performing functions associated with the one or more capabilities. As illustrated in FIG. 5A, device 502, which can represent a device 120 from FIG. 1, includes TPM 506, which can represent TPM or other protector mechanism 132 from FIG. 1. TPM 506 can include a capability store 508 that stores one or more capabilities associated with device 502, such as a first capability 510(1) and a second capability 510(2) in FIG. 5A.

Also illustrated in FIG. 5A, device 502 includes outputs 512, sensors 514, timer 516, and network component 518. For instance, in the example of FIG. 5A, device 502 can represent a computing device that controls the operations of a sprinkler system at a house or business. As such, each of outputs 512 can represent one of the sprinklers that device 502 controls, and each of sensors 514 can represent a sensor associated with the sprinkler system. For instance, first output 512(1) can represent a first sprinkler, second output 512(2) can represent a second sprinkler, third output 512(3) can represent a third sprinkler, and fourth output 512(4) can represent a fourth sprinkler. Additionally, first sensor 514(1) can represent a temperature sensor, and second sensor 514(2) can represent a moisture sensor.

Timer 516 can represent a timer associated with device 502. Timer 516 can determine the current time, and based on the current time, cause device 502 to activate one or more outputs 512. Network component 518 can represent a component on device 502 that uses a network to collect data about weather patterns. For instance, network component 518 can search weather Web sites to determine weather patterns at the geographic location of device 502. Device 502 can then use the weather patterns to determine when to turn on and off each of outputs 512.

In the example of FIG. 5A, device 502 can come preconfigured to include first capability 510(1) and second capability 510(2). First capability 510(1) can provide device 502 with functions that include turning on and off first output 512(1) and first sensor 514(1). Second capability 510(2) can provide device 502 with functions that include turning on and off second output 512(2) and second sensor 514(2). As such, when a user first acquires device 502, the user is only able to use first output 512(1), second output 512(2), first sensor 514(1), and second sensor 514(2) (which are illustrated using solid lines in FIG. 5A) of device 502. In order to use the additional functions of device 502, such as third output 512(3), fourth output 512(4), timer 516, and network component 518 (which are illustrated as dashed lines in FIG. 5A), the user can use the device to acquire additional capabilities for device 502 from server 504, where server 504 can represent one of device(s) 106 from FIG. 1.

Figure 5B:
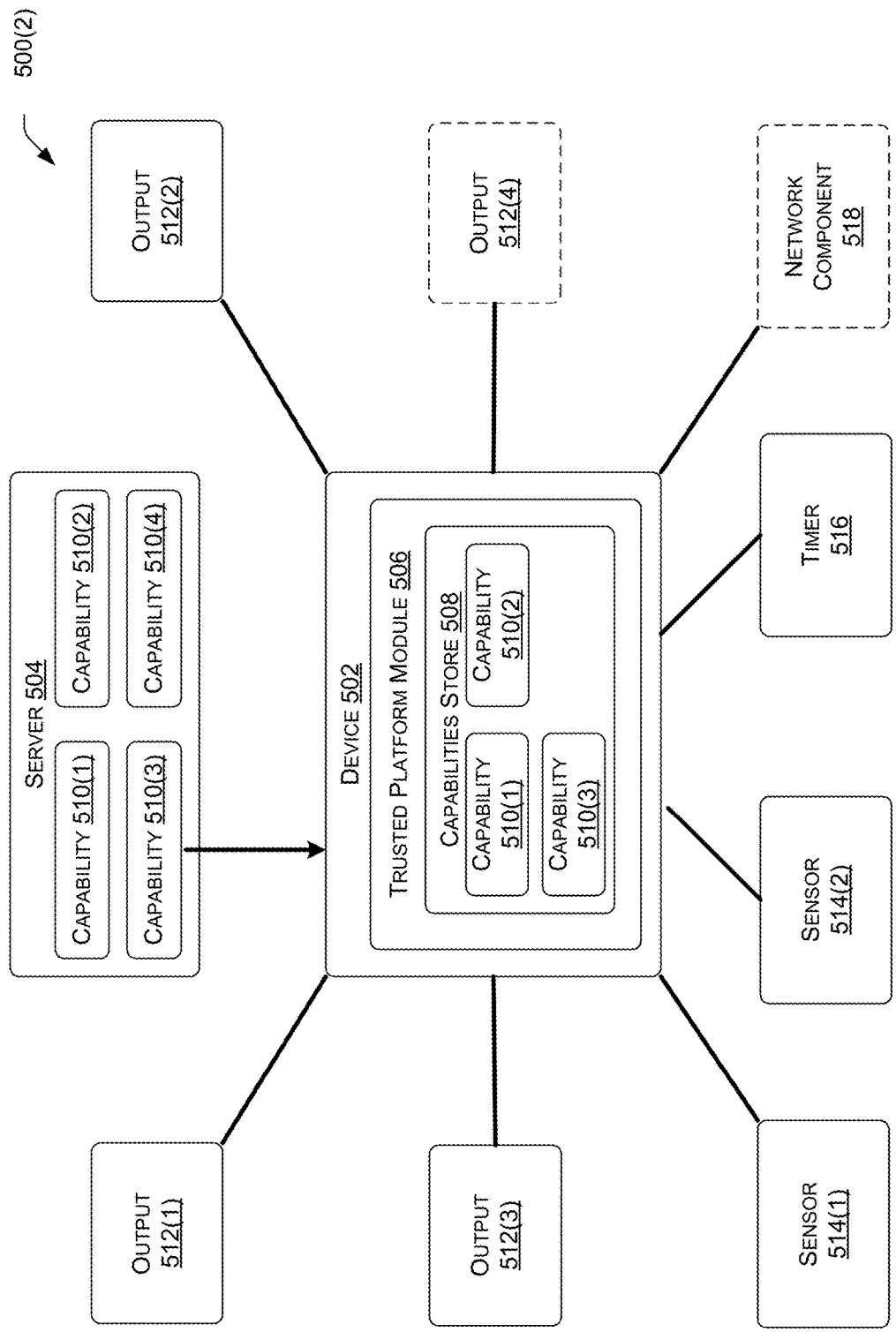

FIG. 5B depicts a second example environment 500(2) of device 502 receiving one or more capabilities from server 504 and performing functions associated with the one or more capabilities. In the example of FIG. 5B, device 502 acquires third capability 510(3) form server 504 in order to add additional functionality to device 502.

For instance, the user may want to add functionality to device 502, such as a third output 512(3) and a timer 516. To add the additional functionality to device 502, the user can use device 502 to acquire third capability 510(3) from server 504, where third capability 510(3) provides device 502 with the capability to use both third output 512(3) and timer 516. To acquire the third capability 510(3), device 502 sends a request for third capability 510(3) to server 504. Server 504 can then verify device 502 using an endorsement key associated with device 502 and/or verify capability store 508 using an authority public key associated with capability store 508 (using the operations described above). After verifying device 502 and/or capability store 508, server 504 can issue capability store content for device 502 and authorize a write operation for device 502 using an authority private key. In response, capability store 508 of device 502 includes third capability 510(3). In the example of FIG. 5B, device 502 is now able to use third output 512(3) and timer 516 (which are now illustrated using solid lines in FIG. 5B).

After acquiring third capability 510(3) from server 504, the user may then decide that he or she wants to add additional functionality to device 502. As such, FIG. 5C depicts a third example environment 500(3) of device 502 receiving one or more capabilities from server 504 and performing functions associated with the one or more capabilities. In the example of FIG. 5C, device 502 acquires fourth capability 510(4) form server 504 in order to add additional functionality to device 502.

For instance, the user may want to add functionality to device 502, such as of a fourth output 512(4) and a network component 518. To add the additional functionality to device 502, the user can use device 502 to acquire fourth capability 510(4) from server 504, where fourth capability 510(4) provides device 502 with the capability to use both fourth output 512(4) and network component 518. To acquire the fourth capability 510(4), device 502 sends a request for fourth capability 510(4) to server 504. Server 504 can then verify device 502 using an endorsement key associated with device 502 and/or verify capability store 508 using an authority public key associated with capability store 508 (using the operations described above). After verifying device 502 and/or capability store 508, server 504 can issue capability store content for device 502 and authorize a write operation for device 502 using an authority private key. In response, capability store 508 of device 502 includes fourth capability 510(4). In the example of FIG. 5C, device 502 is now able to use fourth output 512(4) and network component 518 (which are now illustrated using solid lines in FIG. 5C).

FIGS. 6-10 are flow diagrams of illustrative processes for providing a device with a trusted device capability store. The processes are illustrated as a collection of blocks in a logical flow graph, which represent a sequence of operations that can be implemented in hardware, software, or a combination thereof. The blocks are referenced by numbers. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 6:
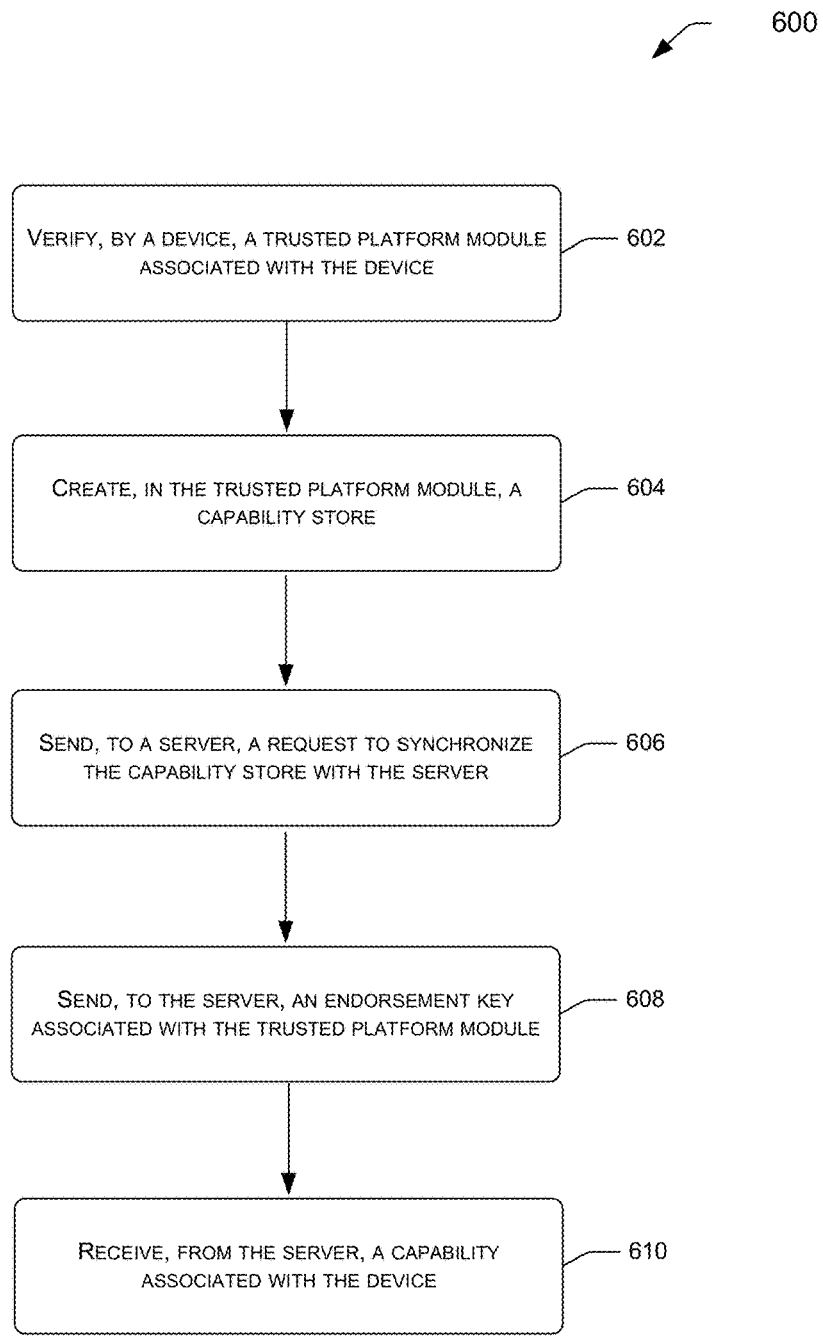
FIG. 6 is a flow diagram of an illustrative process for a device synchronizing a TPM or other protector mechanism with a server.

FIG. 6 is a flow diagram of an illustrative process for a device synchronizing a TPM or other protector mechanism with a server. At 602, the device can verify a TPM or other protector mechanism associated with the device. For instance, the device can read an endorsement public key associated with the TPM or other protector mechanism in order to verify a stored endorsement key name. The device can then start an identity bound session with the TPM or other protector mechanism.

At 604, the device can create, in the TPM or other protector mechanism, a capability store and at 606, the device can send, to a server, a request to synchronize the capability store with the server. For instance, the capability store can store one or more capabilities associated with the device. As such, after the capability store is created, the device can synchronize the capability store with the server in order to receive the one or more capabilities from the server.

At 608, the device can send, to the server, an endorsement key associated with the TPM or other protector mechanism and at 610, the device can receive, from the server, a capability associated with the device. For instance, the device can send an endorsement public key to the server in order for the server to verify the device. The server can then identify a capability associated with the device from a database and send the TPM or other protector mechanism an authorized write operation associated with the capability. In response, the TPM or other protector mechanism can store the capability in the capability store.

Figure 7:
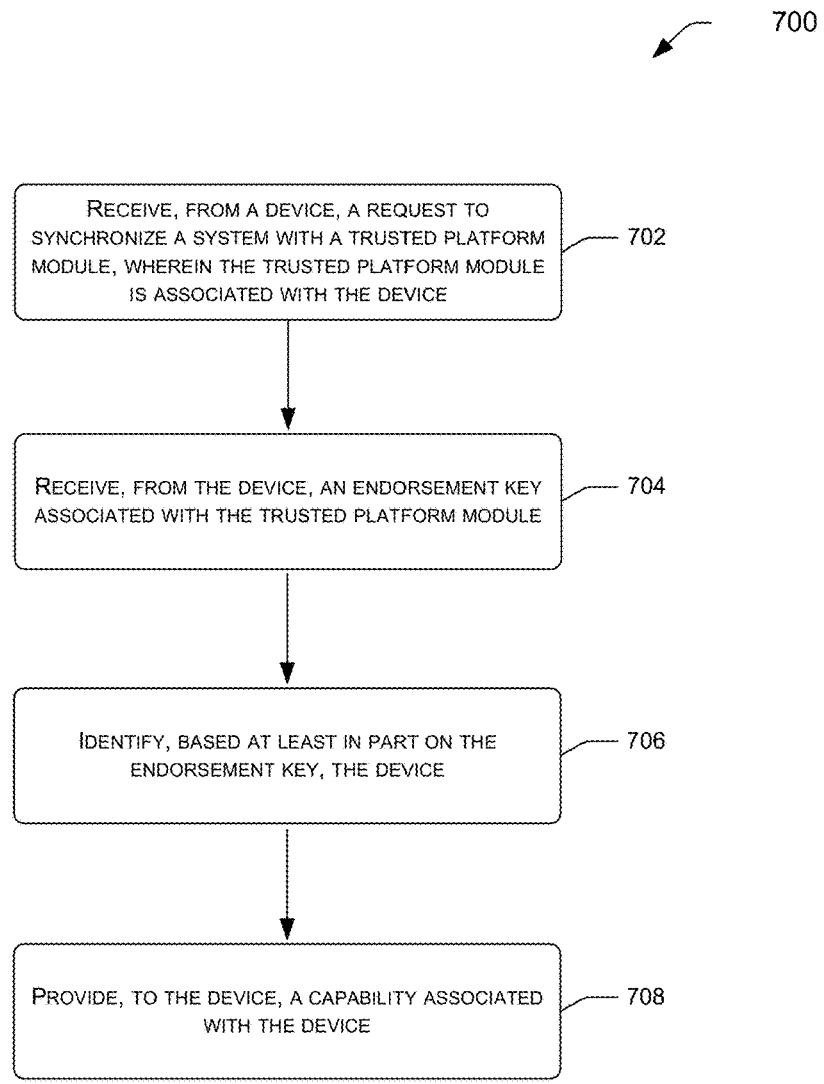
FIG. 7 is a flow diagram of an illustrative process of a server synchronizing with a TPM or other protector mechanism on a device.

FIG. 7 is a flow diagram of an illustrative process of a server synchronizing with a TPM or other protector mechanism on a device. At 702, the system can receive, from a device, a request to synchronize the system with a TPM or other protector mechanism, wherein the TPM or other protector mechanism is associated with the device. For instance, the system can receive a request to synchronize capabilities stored by the system with a capability store on the TPM or other protector mechanism.

At 704, the system can receive, from the device, an endorsement key associated with the TPM or other protector mechanism and at 706, the system can identify, based at least in part on the endorsement key, the device. For instance, the system can receive an endorsement public key from the device. The system can then search through a database of stored endorsement keys to identity the device using the endorsement public key.

At 708, the system can provide, to the device, a capability associated with the device. For instance, the system can issue capability store content for the device. In some examples, the capability store content can include stored capabilities associated with the device. The system can then send an authorized write operation associated with the stored capabilities to the device. In some examples, the system first signs the authorized write operation with an authority private key that is associated with the TPM or other protector mechanism before sending the authorized write operation to the device.

Figure 8:
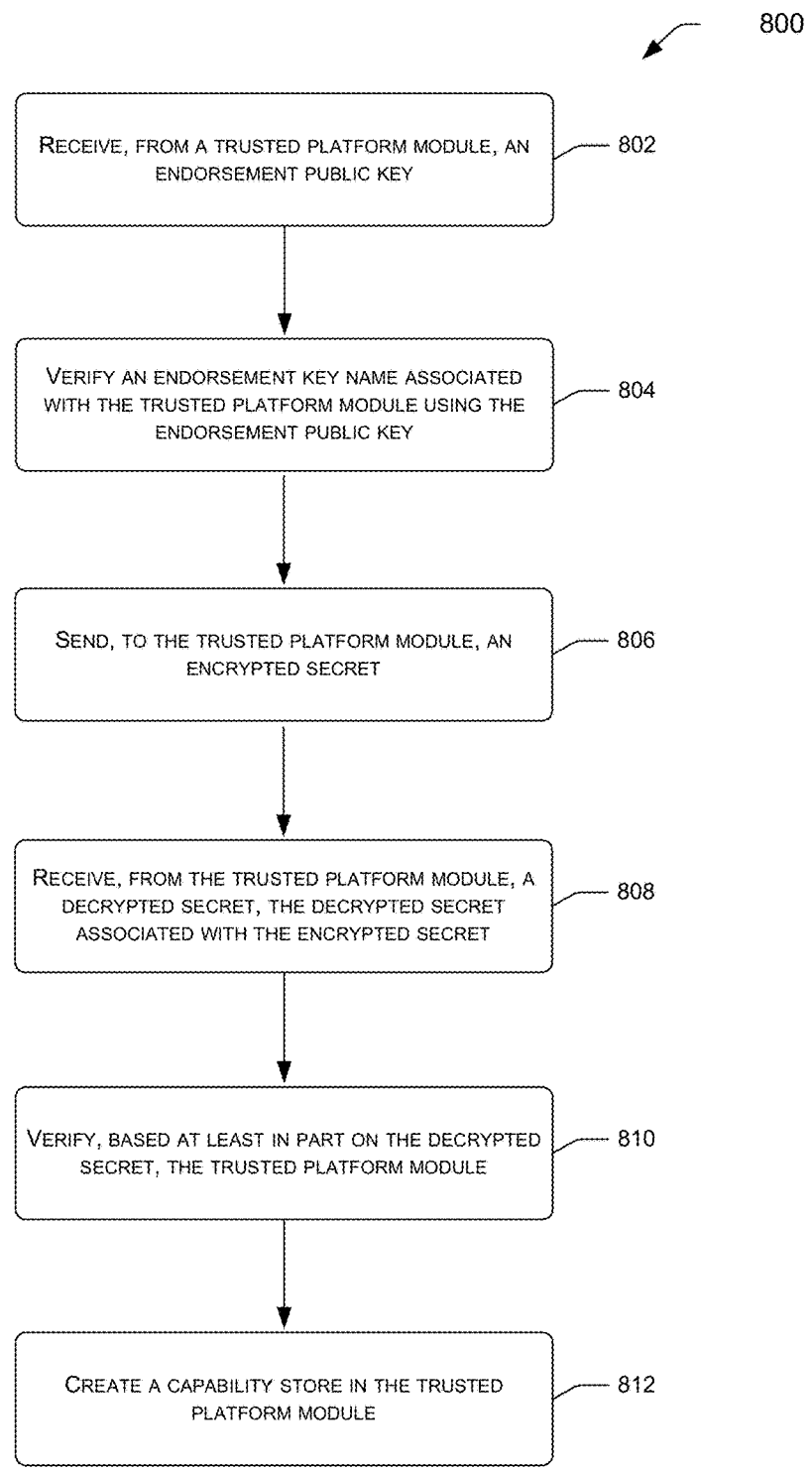
FIG. 8 is a flow diagram of an example illustrative process for creating a trusted device capability store in a TPM or other protector mechanism.

FIG. 8 is a flow diagram of an example illustrative process for creating a trusted device capability store in a TPM or other protector mechanism. At 802, a device can receive, from a TPM or other protector mechanism, an endorsement public key. At 804, the device can verify an endorsement key name associated with the TPM or other protector mechanism using the endorsement public key. For instance, the device can determine whether the endorsement key name matches the endorsement public key. Based on the endorsement key name matching the endorsement public key, the device can verify the endorsement key name.

At 806, the device can send, to the TPM or other protector mechanism, an encrypted secret. For instance, in some examples, the device can encrypt a secret using the endorsement public key. As such, only a TPM or other protector mechanism that includes an endorsement key associated with the endorsement public key can decrypt the encrypted secret.

At 808, the device can receive, from the TPM or other protector mechanism, a decrypted secret that is associated with the encrypted secret and at 810, the device can verify, based at least in part on the decrypted secret, the TPM or other protector mechanism. For instance, and as discussed above, only the TPM or other protector mechanism that includes the endorsement key that is associated with the endorsement public key can decrypt the encrypted secret. As such, the device can verify the TPM or other protector mechanism when the device receives the decrypted secret from the TPM or other protector mechanism. In some examples, the secret can include a hash-based authentication code.

At 812, the device can create a capability store in the TPM. In some examples, the device creates the capability store in response to verifying the TPM or other protector mechanism.

Figure 9:
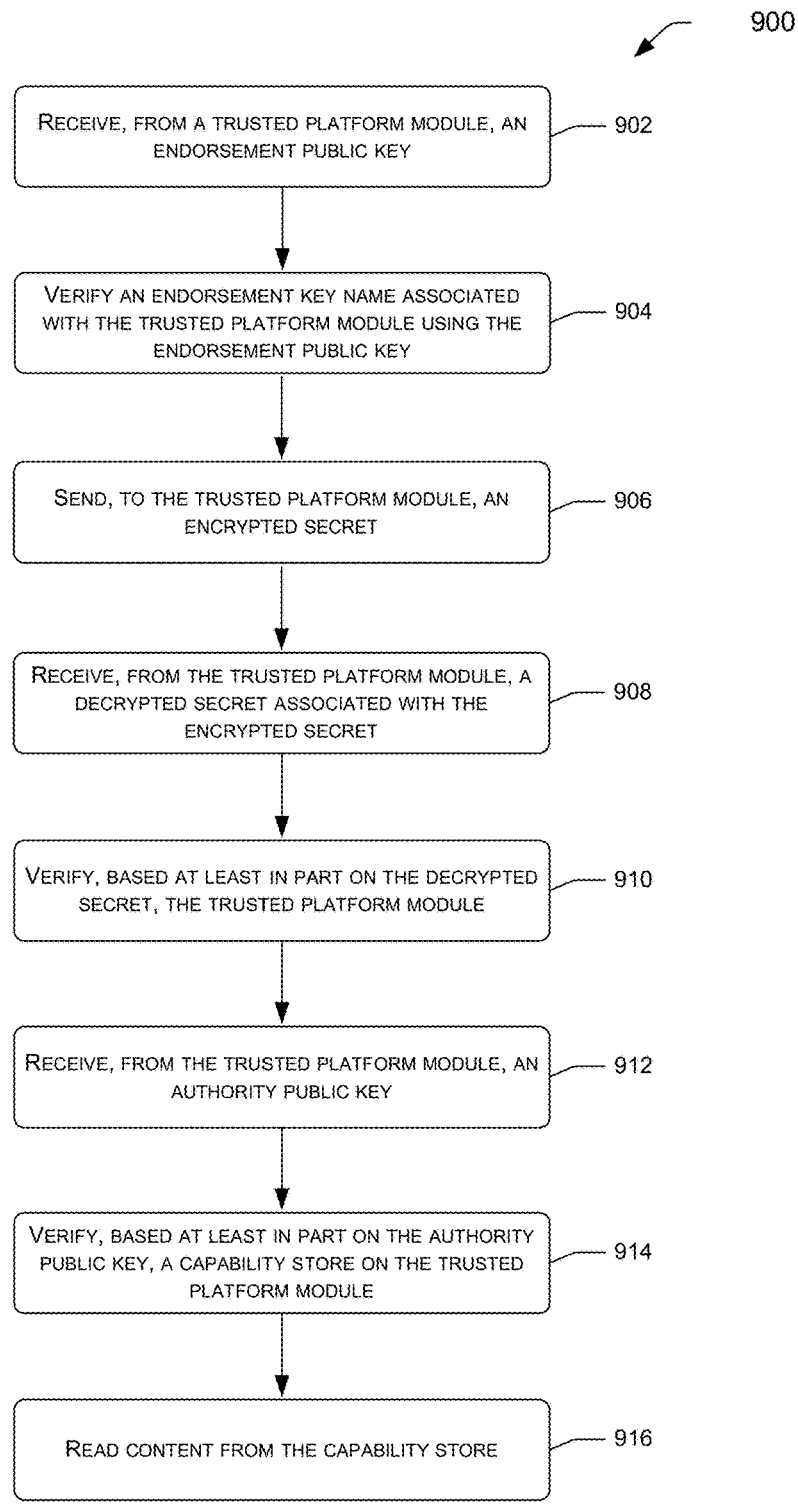
FIG. 9 is a flow diagram of an example illustrative process for reading content from a trusted device capability store on a TPM or other protector mechanism.

FIG. 9 is a flow diagram of an example illustrative process for reading content from a trusted device capability store on TPM or other protector mechanism. At 902, a device can receive, from a TPM or other protector mechanism, an endorsement public key. At 904, the device can verify an endorsement key name associated with the TPM or other protector mechanism using the endorsement public key. For instance, the device can determine whether the endorsement key name matches the endorsement public key. Based on the endorsement key name matching the endorsement public key, the device can verify the endorsement key name.

At 906, the device can send, to the TPM or other protector mechanism, an encrypted secret. For instance, in some examples, the device can encrypt a secret using the endorsement public key. As such, only a TPM or other protector mechanism that includes an endorsement key associated with the endorsement public key can decrypt the encrypted secret.

At 908, the device can receive, from the TPM or other protector mechanism, a decrypted secret that is associated with the encrypted secret and at 910, the device can verify, based at least in part on the decrypted secret, the TPM or other protector mechanism. For instance, and as discussed above, only the TPM or other protector mechanism that includes the endorsement key that is associated with the endorsement public key can decrypt the encrypted secret. As such, the device can verify the TPM or other protector mechanism when the device receives the decrypted secret from the TPM or other protector mechanism. In some examples, the secret can include a hash-based authentication code.

At 912, the device can receive, from the TPM or other protector mechanism, an authority public key and at 914, the device can verify, based at least in part on the authority public key, a capability store on the TPM or other protector mechanism. For instance, the device can determine that the authority public key matches a fingerprint of the public key.

At 916, the device can read content from the capability store. For instance, the device can read one or more capabilities stored in the capability store. In some examples, reading the content can include taking configuration data from the capability store and performing functions associated with the configuration data.

Figure 10:
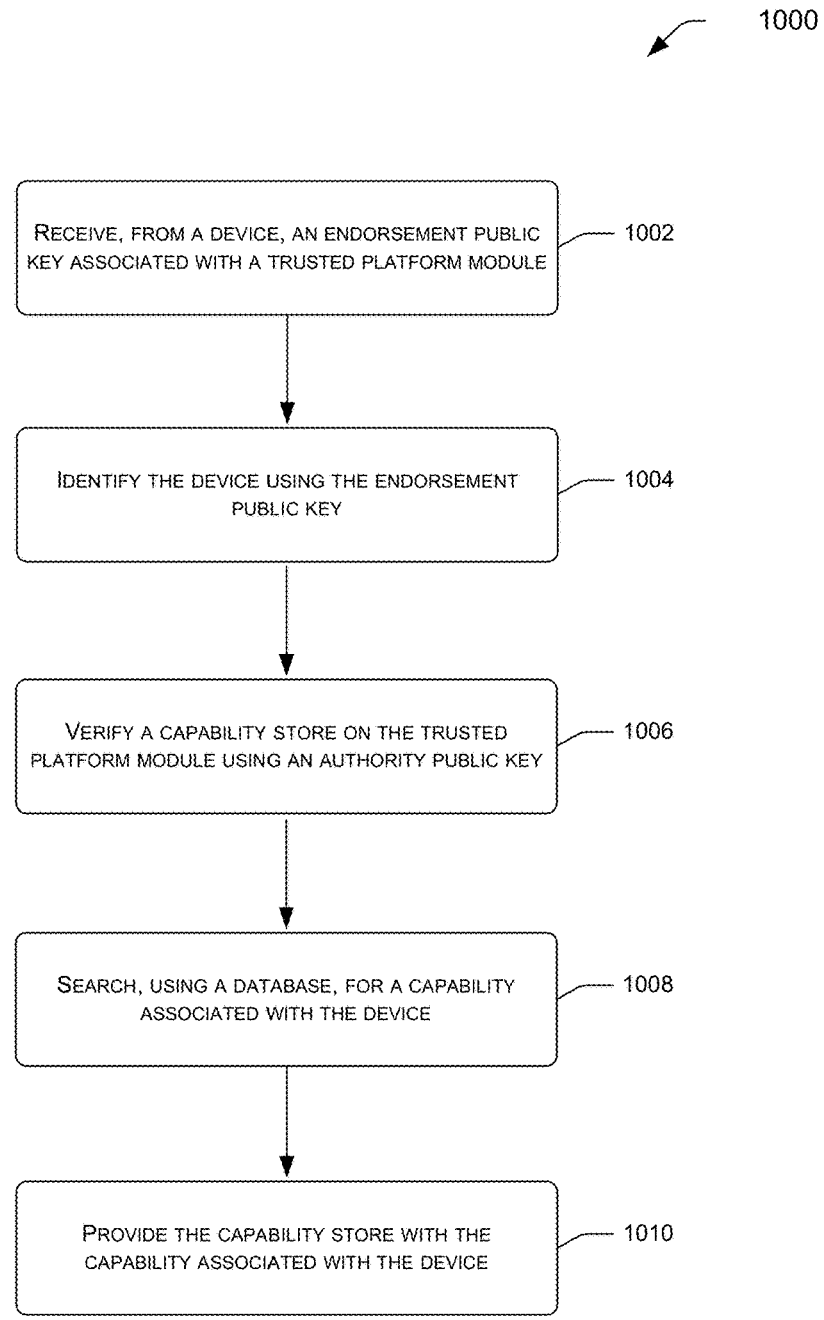
FIG. 10 is a flow diagram of an example illustrative process of a server verifying a trusted device capability store and providing the trusted device capability store with a capability.

FIG. 10 is a flow diagram of an example illustrative process of a server verifying a trusted device capability store and providing the trusted device capability store with a capability. At 1002, the system can receive, from a device, an endorsement public key associated with a TPM or other protector mechanism and at 1004, the system can verify the device using the endorsement public key. For instance, the system can identify the device by searching through a database of stored endorsement keys using the endorsement public key.

At 1006, the system can verify a capability store on the TPM or other protector mechanism using an authority public key. For instance, the system can read metadata associated with a NV storage device from TPM or other protector mechanism and determine whether a policy on the metadata matches the authority public key of an authority private key stored on the server.

At 1008, the server can search, using an identity of the device, for a capability associated with the device. For instance, the server can search a database of stored capabilities using the identity of the device to identify a stored capability that is associated with the device. In some examples, the server searches for the capability associated with the device in response to verifying the capability store on the TPM or other protector mechanism.

At 1010, the system can provide, to the device, the capability associated with the device. For instance, the system can issue capability store content for the device. In some examples, the capability store content can include the stored capability associated with the device. The system can then send an authorized write operation associated with the capability to the device. In some examples, the system first signs the authorized write operation with an authority private key that is associated with the TPM or other protector mechanism before sending the authorized write operation to the device.

It should be noted that in some examples, besides searching for a capability associated with the device, the system can receive a request for a new capability from the device. For instance, a user of the device can cause the device to acquire a new capability. The system can then receive the request and add the new capability to the database of stored capabilities for the device. Additionally, the system can provide the device with the new capability. For instance, the system can send an authorized write operation associated with the new capability to the device.

Example Clauses

A: A device comprising: one or more processors; computer-readable media storing computer-executable instructions that, when executed by the one or more processors, cause the one or more processors to perform operations; and a trusted platform module, the trusted platform module including: an endorsement key that identifies the device; a capability store, the capability store recording a device capability associated with the device; and an access policy, the access policy indicating at least one of unauthorized read access or authorized write access associated with the trusted platform module.

B: A device as paragraph A recites, the computer-readable media storing computer-executable instructions that, when executed by the one or more processors, cause the one or more processors to perform operations further comprising: generating an encrypted secret that can be decrypted using the endorsement key; sending the encrypted secret to the trusted platform module; receiving a decrypted secret from the trusted platform module, wherein the decrypted secret is associated with the encrypted secret; and verifying the trusted platform module using the decrypted secret.

C: A device as paragraph A and/or B recites, the computer-readable media storing computer-executable instructions that, when executed by the one or more processors, cause the one or more processors to perform operations further comprising creating, based at least in part on the verifying, the capability store in the trusted platform module.

D: A device as any of paragraphs A-C recites, the computer-readable media storing computer-executable instructions that, when executed by the one or more processors, cause the one or more processors to perform operations further comprising: sending, to a capability server, a request for an additional device capability; sending, to the capability server, the endorsement key for verifying the trusted platform module; and receiving, from the capability server, a write command corresponding to the additional device capability, and wherein the trusted platform module stores the additional device capability in the capability store.

E: A device as any of paragraphs A-D recites, wherein the authorized write access indicates that the capability server can authorize adding the additional capability to the capability store.

F: A device as any of paragraphs A-E recites, wherein the write command is signed using a private key associated with the trusted platform module, and wherein the trusted platform module verifies the private key using a public key before storing the additional device capability in the capability store.

G: A method comprising: verifying a trusted platform module on a device, the trusted platform module including an access policy indicating authorized write access associated with the trusted platform module; creating, in the trusted platform module, a capability store; sending, to a server, a request to synchronize the capability store with the server; sending, to the server, an endorsement key associated with the trusted platform module; and receiving, from the server, a capability associated with the device.

H: A method as paragraph G recites, wherein the verifying of the trusted platform module comprises verifying the trusted platform module using the endorsement key and an endorsement key name imprinted into firmware of the device, wherein the endorsement key name is associated with the endorsement key.

I: A method as paragraph G and/or H recites, wherein the receiving of the capability comprises receiving, from the server, an authorized write operation that is associated with the capability.

J: A method as any of paragraphs G-I recites, wherein the authorized write operation is signed using an authority private key.

K: A method as any of paragraphs G-J recites, the method further comprising: requesting, from the server, an additional capability; sending, to the server, an authority public key associated with the capability store; and receiving, from the server, the additional capability.

L: A method as any of paragraphs G-K recites, wherein the capability is associated with a function performed by an application on the device; and the method further comprising: reading the endorsement key associated with the trusted platform module; verifying, based at least in part on the reading, the trusted module platform; reading the capability from the capability store; and causing the application to perform the function associated with the capability.

M: A method as any of paragraphs G-L recites, further comprising sending, to the server, a message indicating that the capability is added in the capability store.

N: A computer-readable medium having computer-executable instructions thereon, the computer-executable instructions to configure a computer to perform a method as any of paragraphs G-M recite.

O: A device comprising: a computer-readable media having computer-executable instructions thereon to configured a computer to perform a method as any of paragraphs G-M recite; and a processing unit adapted to execute the instructions to perform the method as any of paragraphs G-M recites.

P: A system comprising: a database storing a capability associated with a device; one or more processors; and computer-readable medium including modules, the modules when executed by the one or more processors, configure the system to execute a capability synchronization with a trusted platform module, the modules comprising: a synchronization module configured to receive, from the device, a request to synchronize the system with the trusted platform module, the trusted platform module being associated with the device; a verification module configured to: receive, from the device, an endorsement key associated with the trusted platform module; and identify, based at least in part on the endorsement key, the device; and an authorization module configured to provide, to the device, the capability associated with the device.

Q: A system as paragraph P recites, further comprising: a private key associated with the trusted platform module, wherein the verification module is further configured to: receive, from the device, a public key associated with a capability store stored in the trusted platform module; determine that the public key is associated with the private key; and verify, based at least in part on the determining, the capability store.

R: A system as paragraph P and/or Q recites, wherein the providing of the capability associated with the device comprises sending, to the device, an authorized write operation associated with the capability.

S: A system as any of paragraphs P-R recites, wherein before the sending of the authorized write operation to the device, the authorization module is further configured to sign the authorized write operation using an authority private key, the authority private key providing the server with the authority to write data into the trusted platform module.

T: A system as any of paragraphs P-S recites, wherein the synchronization module is further configured to: receive, from the device, a request to acquire an additional capability; and add the additional capability to the database.

U: A system as any of paragraphs P-T recites, wherein the authorization module is further configured to provide the additional capability to the device.

V: A system as any of paragraphs P-U recites, wherein: the synchronization module is further configured to determine that the trusted platform module includes an additional capability, wherein the additional capability is not stored in the database; and the authorization module is further configured to provide, to the device, an authorized write operation that removes the additional capability from the trusted platform module.

W: A system comprising a means for receiving, from the device, a request to synchronize the system with a trusted platform module, the trusted platform module being associated with the device; a means for receiving, from the device, an endorsement key associated with the trusted platform module; a means for identifying, based at least in part on the endorsement key, the device; and a means for providing, to the device, the capability associated with the device.

X: A system as paragraph W recites, further comprising a means for receiving, from the device, a public key associated with a capability store stored in the trusted platform module; a means for identifying that the public key is associated with the private key; and a means for identifying, based at least in part on the determining, the capability store.

Y: A system as paragraph W and/or X recites, wherein the providing of the capability associated with the device comprises sending, to the device, an authorized write operation associated with the capability.

Z: A system as any of paragraphs W-Y recites, further comprising a means for signing the authorized write operation using an authority private key, the authority private key providing the server with the authority to write data into the trusted platform module.

AA: A system as any of paragraphs W-Z recites, further comprising a means for receiving, from the device, a request to acquire an additional capability; and a means for adding the additional capability to the database.

AB: A system as any of paragraphs W-AA recites, further comprising a means for providing the additional capability to the device.

AC: A system as any of paragraphs W-AB recites, further comprising a means for determining that the trusted platform module includes an additional capability, wherein the additional capability is not stored in the database; and a means for providing, to the device, an authorized write operation that removes the additional capability from the trusted platform module.

AD: A system comprising: means for verifying a trusted platform module on a device, the trusted platform module including an access policy indicating authorized write access associated with the trusted platform module; means for creating, in the trusted platform module, a capability store; means for sending, to a server, a request to synchronize the capability store with the server; means for sending, to the server, an endorsement key associated with the trusted platform module; and means for receiving, from the server, a capability associated with the device.

AE: A system as paragraph AD recites, wherein the means for verifying of the trusted platform module comprises means for verifying the trusted platform module using the endorsement key and an endorsement key name imprinted into firmware of the device, wherein the endorsement key name is associated with the endorsement key.

AF: A system as paragraph AD and/or AE recites, wherein the means for receiving of the capability comprises means for receiving, from the server, an authorized write operation that is associated with the capability.

AG: A system as any of paragraphs AD-AF recites, wherein the authorized write operation is signed using an authority private key.

AH: A system as any of paragraphs AD-AG recites, the system further comprising: means for requesting, from the server, an additional capability; means for sending, to the server, an authority public key associated with the capability store; and means for receiving, from the server, the additional capability.

AI: A system as any of paragraphs AD-AH recites, wherein the capability is associated with a function performed by an application on the device; and the system further comprising: means for reading the endorsement key associated with the trusted platform module; means for verifying, based at least in part on the reading, the trusted module platform; means for reading the capability from the capability store; and means for causing the application to perform the function associated with the capability.

AJ: A system as any of paragraphs AD-AI recites, further comprising means for sending, to the server, a message indicating that the capability is added in the capability store.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 106, 120, 200, 300, 404, and/or 406, such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A device, comprising:
a memory to store data and instructions;
one or more processors in communication with the memory; and
a trusted platform module in communication with the memory and the one or more processors that includes an endorsement key that identifies the device and a capability store that stores capabilities associated with the device based on an access policy that authorizes the device to create the capability store in the trusted platform module, wherein the trusted platform module is configured to:
receive a request from an entity to access the capability store;
determine whether the entity is authorized to access the capability store based on the access policy that provides authorized entities an authorized read access and an authorized write access to the capability store, wherein the authorized entities have an authority private key associated with the trusted platform module; and
authorize the access to the capability store when the entity has the authority private key.

2. A device as claim 1 recites, are further configured to:
generate an encrypted secret that can be decrypted using the endorsement key;
send the encrypted secret to the trusted platform module;
receive a decrypted secret from the trusted platform module, wherein the decrypted secret is associated with the encrypted secret; and
verify the trusted platform module using the decrypted secret.

3. A device as claim 2 recites, wherein the one or more processors are further configured to create based at least in part on the verifying, the capability store in the trusted platform module.

4. A device as claim 1 recites, wherein the one or more processors are further configured to:
send, to a capability server, a request for an additional device capability;
send, to the capability server, the endorsement key for verifying the trusted platform module; and
receive, from the capability server, a write Command corresponding to the additional device capability, and wherein the trusted platform module stores the additional device capability in the capability store.

5. A device as claim 4 recites, wherein the authorized write access indicates that the capability server can authorize adding the additional capability to the capability store.

6. A device as claim 4 recites, wherein the trusted platform module verifies the private key using a public key before storing the additional device capability in the capability store.

7. A method, comprising:
creating, in a trusted platform module on a device, a capability store that stores capabilities associated with the device based on an access policy that authorizes the device to create the capability store in the trusted platform module;
sending, to a server, a request to synchronize the capability store with the server;
sending, to the server, an endorsement key associated with the trusted platform module;
receiving, from the server, a write command with at least one capability associated with the device;
determining whether to access the capability store based on the access policy that provides authorized entities an authorized read access and an authorized write access to the capability store, wherein the authorized entities have an authority private key associated with the trusted platform module; and
authorize the write command to the capability store when the write command is signed with the authority private key associated with the trusted platform module.

8. A method as claim 7 recites, further comprising:
verifying the trusted platform module on a device using the endorsement key and an endorsement key name imprinted into firmware of the device, wherein the endorsement key name is associated with the endorsement key.

9. A method as claim 7 recites, the method further comprising:
requesting, from the server, an additional capability;
sending, to the server, an authority public key associated with the capability store; and
receiving, from the server, the additional capability.

10. A method as claim 7 recites, wherein the at least one capability is associated with a function performed by an application on the device; and the method further comprising:
reading the endorsement key associated with the trusted platform module;
verifying, based at least in part on the reading, the trusted module platform;
reading the at least one capability from the capability store; and
causing the application to perform the function associated with the at least one capability.

11. A method as claim 7 recites, further comprising sending, to the server, a message indicating that the at least one capability is added or removed in the capability store.

12. The method of claim 7, wherein the access policy indicates that an owner of the device can remove the capability store from the trusted platform module.

13. A system, comprising:
a database storing at least one capability associated with a device;
one or more processors; and
a synchronization module, a verification module, and an authorization module in communication with the one or more processors and the database, wherein
the synchronization module is configured to receive, from the device, a request to synchronize capabilities stored by the system with a capability store in a trusted platform module that stores capabilities associated with the device based on an access policy that authorizes the device to create the capability store in the trusted platform module, the trusted platform module being associated with the device;
the verification module is configured to:
receive, from the device, an endorsement key associated with the trusted platform module; and
identify, based at least in part on the endorsement key, the device; and
the authorization module is configured to provide, to the device, a write access to the capability store signed with an authority private key with the at least one capability associated with the device, wherein access is provided to the capability store based on the access policy that provides authorized entities an authorized read access and an authorized write access to the capability store, wherein the authorized entities have the authority private key associated with the trusted platform module.

14. A system as claim 13 recites,
wherein the verification module is further configured to:
receive, from the device, a public key associated with a capability store stored in the trusted platform module;
determine that the public key is associated with the private key; and
verify, based at least in part on the determining, the capability store.

15. A system as claim 13 recites, wherein the authority private key provides the server with the authority to write data into the trusted platform module.

16. A system as claim 13 recites, wherein the synchronization module is further configured to:
receive, from the device, a request to acquire an additional capability; and
add the additional capability to the database.

17. A system as claim 16 recites, wherein the authorization module is further configured to provide the additional capability to the device.

18. A system as claim 13 recites, wherein:
the synchronization module is further configured to determine that the trusted platform module includes an additional capability, wherein the additional capability is not stored in the database; and
the authorization module is further configured to provide, to the device, an authorized write operation that removes the additional capability from the trusted platform module.

* * * * *